(12) United States Patent
Yamaji et al.

(10) Patent No.: US 7,603,577 B2
(45) Date of Patent: Oct. 13, 2009

(54) CONTROLLING SUPPLY OF POWER WITHIN AN INFORMATION PROCESSING APPARATUS BASED ON MEASURED PHYSICAL QUANTITY

(75) Inventors: Hidenori Yamaji, Tokyo (JP); Yoshihiro Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 11/926,754

(22) Filed: Oct. 29, 2007

(65) Prior Publication Data

US 2008/0058032 A1 Mar. 6, 2008

Related U.S. Application Data

(62) Division of application No. 11/092,542, filed on Mar. 28, 2005, now Pat. No. 7,543,169.

(30) Foreign Application Priority Data

Mar. 29, 2004 (JP) ............................ P2004-096155

(51) Int. Cl.
*G06F 1/00* (2006.01)
*G01C 21/00* (2006.01)
(52) U.S. Cl. .................... 713/323; 713/300; 701/213
(58) Field of Classification Search ................ 713/323, 713/300; 701/213
See application file for complete search history.

(56) References Cited

U.S. PATENT DOCUMENTS 7,064,671 B2 * 6/2006 Vanderah et al. ......... 340/636.1
7,184,745 B2 * 2/2007 Ballantyne et al. ....... 455/404.2
7,409,188 B2 * 8/2008 Syrjarinne et al. ......... 455/13.4

FOREIGN PATENT DOCUMENTS

| | | |
|---|---|---|
| JP | 59-114421 | 7/1984 |
| JP | 62-215825 | 9/1987 |
| JP | 64-007213 | 1/1989 |
| JP | 1-104323 | 4/1989 |
| JP | 11-83529 | 3/1999 |
| JP | 2000-98017 | 4/2000 |
| JP | 2001-117903 | 4/2001 |
| JP | 2003-196762 | 7/2003 |
| JP | 2003-281671 | 10/2003 |
| JP | 2004-21778 | 1/2004 |
| WO | WO 03/090887 A1 | 11/2003 |

* cited by examiner

*Primary Examiner*—Thomas Lee
*Assistant Examiner*—Stefan Stoynov
(74) *Attorney, Agent, or Firm*—Oblon, Spivak, McClelland, Maier & Neustadt, L.L.P.

(57) ABSTRACT

An information processing apparatus including detection units to detect physical quantities as targets for detection, and a control unit to measure a physical quantity based on a result of detection by a first detection unit and also to control a supply of power to a second detection unit in response to a result of measurement of the physical quantity. The second detection unit includes a first positioning unit to execute positioning outdoors, and a second positioning unit to execute positioning indoors. When it is determined from a dose of ultraviolet rays measured based on a result of detection by the first detection unit that the control unit is present outdoors, the control unit sets a higher priority to the first positioning unit as compared to the second positioning unit, and controls a supply of power so that positioning is executed only by the first positioning unit.

19 Claims, 24 Drawing Sheets

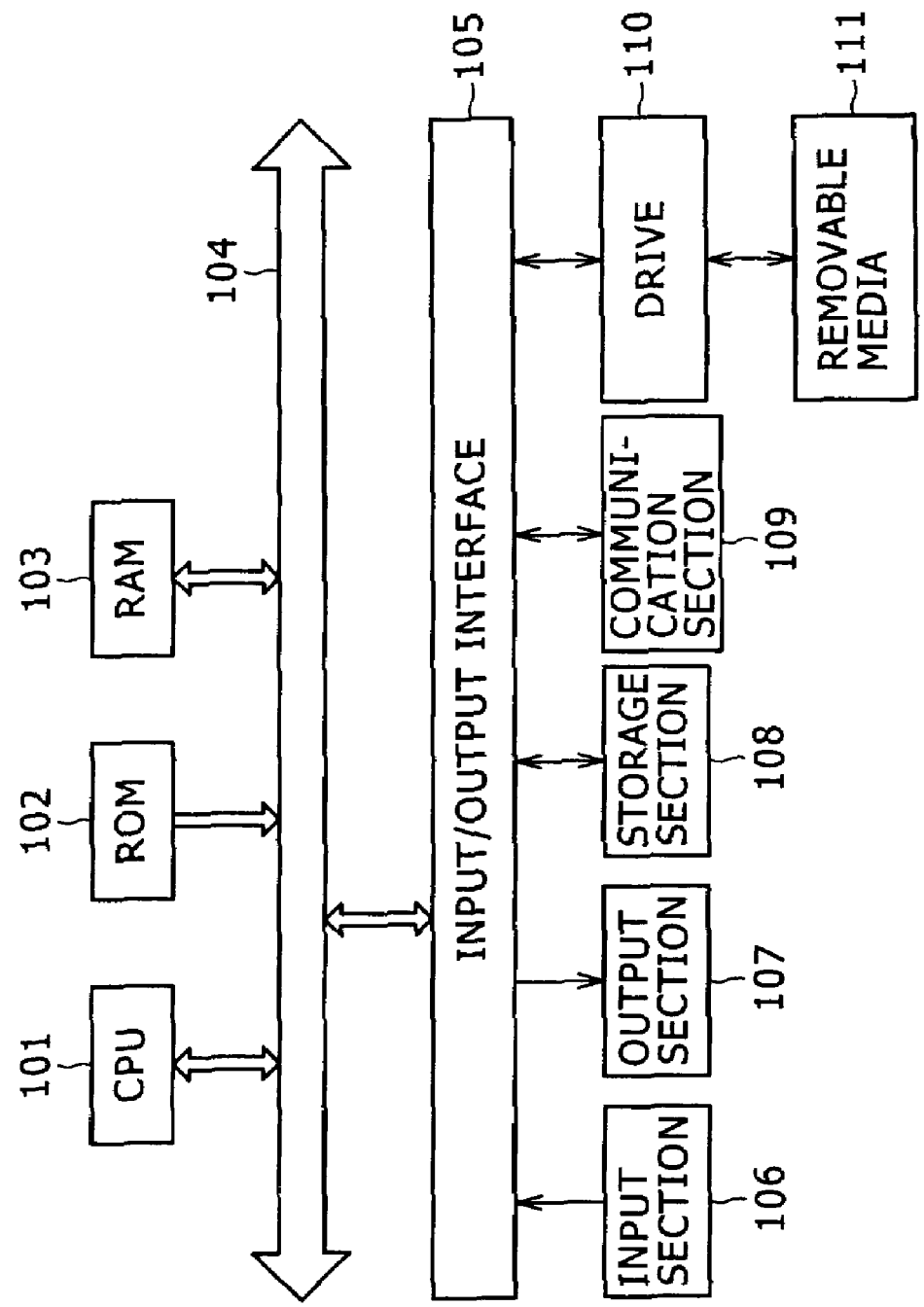

CONTROLLING SUPPLY OF POWER WITHIN AN INFORMATION PROCESSING APPARATUS BASED ON MEASURED PHYSICAL QUANTITY

CROSS REFERENCE TO RELATED APPLICATIONS

This application is a Division of and is based upon and claims the benefit of priority under 35 U.S.C. §120 for U.S. Ser. No. 11/092,542, filed Mar. 28, 2005, and claims the benefit of priority under 35 U.S.C. § 119 from Japanese Patent Application No. P2004-096155, filed Mar. 29, 2004, the entire contents of each which are incorporated herein by reference.

BACKGROUND OF THE INVENTION

The present invention relates to an information processing apparatus, an information processing method, and a program for the same, and more specifically to an information processing apparatus and an information processing method enabling reduction of power consumption and to a program for the same.

In association with the recent tendency for increasingly higher sophistication of portable devices such as a PDA (Personal Digital Assistants) or a mobile telephone, and some of the devices incorporated therein a plurality of sensors including a CCD (Charge Coupled Device), a GPS (Global Positioning System) sensor, a finger print detection sensor and the like.

In the portable devices incorporating therein various types of sensors as described above, it is necessary to supply a power not only to the sensors themselves, and also to a microcomputer sampling signals outputted from the sensors with a battery having a limited capacity. Therefore power saving in each sensor and in the microcomputer is especially demanded.

Consequently, to reduce power consumption in each sensor, there has been proposed the technique for stopping supply of a power to each sensor during a period after the end of previous sampling until start of next sampling.

Further to reduce power consumption consumed by a microcomputer, there has been proposed the technique for setting the microcomputer in the sleep state in which power consumption is low, for instance, by stopping clocking while each signal outputted from each sensor is being sampled.

Patent Document 1 discloses the technique for reducing power consumption in each sensor by providing, separately from a CPU (Central Processing Unit), a standby control circuit for controlling ON/OFF of a power for the sensor and intermittently running the sensor with the standby control circuit. Also there has been disclosed the technique for setting circuits in the CPU other than those for detecting input signals so that power consumption in the CPU can be reduced.

Patent Document 1:

Japanese Patent Laid-Open No. 2000-88605

In a case where sensors are run intermittently, however, in some types of sensors, a normal result of detection cannot be outputted immediately when power supply is started, and thus an erroneous value may be obtained as a result of sampling, which is disadvantageous.

Further when the state of a microcomputer is returned from the sleep state to the normal state, sometimes the state switching can not be executed at a high speed, for instance, because a certain period of time is required until PLL (Phase Lock Loop) of a memory used in the microcomputer is stabilized, which is also disadvantageous.

In addition, when a sensor required executing sampling in a short cycle is used, a load to the microcomputer increases, which naturally results in increase of power consumption in the microcomputer.

SUMMARY OF THE INVENTION

The present invention has been made in consideration of the circumstances as described above. Accordingly, it is an object of the present invention to reduce power consumption.

A first information processing apparatus according to the present invention includes a detection unit for detecting a physical quantity as a target for detection; a first control unit for measuring the physical quantity based on a result of detection by the detection unit and also controlling supply of a power to the detection unit; and a first storage unit for storing therein a period of time after measurement of the physical quantity by the first control unit is finished until measurement for the physical quantity is carried out next as a standby period with the first control unit shifted to the standby state during the period. Preferably, the first control unit can repeat the processing of starting supply of a power to the detection unit and then measuring the physical quantity based on a result of detection by the detection unit and the processing for terminating supply of a power to the detection unit, shifting its own state to the standby state, and returning from the standby state after passage of the standby period.

The first information processing apparatus according to the present invention may further include a second storage unit for storing therein data indicating a physical quantity measured by the first control unit. In this configuration, the first control unit can supply a predetermined quantity of data each indicating a physical quantity to the second control unit when the predetermined quantity of data each indicating a physical quantity has been stored in the second storage unit.

The first information processing method according to the present invention is executed by an information processing apparatus including a detection unit for detecting a physical quantity as a target for detection and a control unit for measuring the physical quantity based on a result of detection by the detection unit and also controlling supply of a power to the detection unit, and the method includes the step of storing a period of time after measurement of the physical quantity by the control unit is finished until measurement for the physical quantity is executed next as a standby period with the control unit shifted to the standby state during the period; and providing controls for repeating the processing of starting supply of a power to the detection unit and then measuring the physical quantity based on a result of detection by the detection unit and the processing for terminating supply of a power to the detection unit, shifting its own state to the standby state, and returning from the standby state after passage of the standby period.

A first program according to the present invention is a program to be executed by a computer for controlling an information processing apparatus including a detection unit for detecting a physical quantity as a target for detection and a control unit for measuring the physical quantity based on a result of detection by the detection unit and also controlling supply of a power to the detection unit, the program including the steps of storing a period of time after measurement of the physical quantity by the control unit is finished until measurement for the physical quantity is executed next as a standby period with the control unit shifted to the standby state during the period; and providing controls for repeating the processing of starting supply of a power to the detection unit and then measuring the physical quantity based on a result of detection by the detection unit and the processing for terminating supply of a power to the detection unit, shifting its own state to the standby state, and returning from the standby state after passage of the standby period.

A second information processing apparatus according to the present invention includes a detection unit for detecting a physical quantity as a target for detection; a control unit for measuring the physical quantity based on a result of detection by the detection unit and also controlling supply of a power to the detection unit; and a storage unit for storing therein a period of time after measurement of the physical quantity by the first control unit is finished until measurement for the physical quantity is carried out next as a standby period with the control unit shifted to the standby state during the period. Preferably, the control unit can start supply of a power to the detection, shifts its own state to the standby state, then returns from the standby state after passage of the standby period, and measures the physical quantity based on a result of detection by the detection unit.

A second information processing method executed by an information processing apparatus includes a detection unit for detecting a physical quantity as a target for detection and a control unit for measuring the physical quantity based on a result of detection by the detection unit and also controlling supply of a power to the detection unit, the method including the steps of storing a period of time after supply of a power to the detection unit is started by the control unit until a normal result of detection by the detection unit is obtained as a standby period with the control unit shifted to the standby state during the period; and providing controls for starting supply of a power to the detection unit, shifting the control unit into the standby state, returning the control unit from the standby state after passage of the standby period, and measuring the physical quantity based on a result of detection by the detection unit.

A second program to be executed by a computer for controlling an information processing apparatus including a detection unit for detecting a physical quantity as a target for detection and a control unit for measuring the physical quantity based on a result of detection by the detection unit and also controlling supply of a power to the detection unit, the program including the steps of storing a period of time after supply of a power to the detection unit is started by the control unit until a normal result of detection by the detection unit is obtained as a standby period with the control unit shifted to the standby state during the period; and providing controls for starting supply of a power to the detection unit, shifting the control unit into the standby state, returning the control unit from the standby state after passage of the standby period, and measuring the physical quantity based on a result of detection by the detection unit.

A third information processing apparatus according to the present invention includes a detection unit for detecting a physical quantity as a target for detection; a control unit for measuring the physical quantity based on a result of detection by the detection unit and also controlling supply of a power to the detection unit; and an estimation unit for estimating a normal result of detection by the detection unit obtained after passage of a predetermined period of time after supply of a power to the detection unit is started based on a result of measurement of the physical quantity by the control unit. Preferably, the control unit can start supply of a power to the detection unit, measures the physical quantity based on a result of detection by the detection unit, and stops, when a normal result of detection is estimated by the estimation unit, supply of a power to the detection unit.

The control unit can further stop supply of a power to the detection unit and then shift the state of the unit itself to the standby state.

A third information processing method according to the present invention is executed by an information processing apparatus including a detection unit for detecting a physical quantity as a target for detection and a control unit for measuring the physical quantity based on a result of detection by the detection unit and also controlling supply of a power to the detection unit, and the method includes the steps of estimating a normal result of detection by the detection unit obtained after passage of a predetermined period of time after supply of a power to the detection unit is started based on a result of measurement of the physical quantity by the control unit; and providing controls for starting supply of a power to the detection unit, measuring the physical quantity based on a result of detection by the detection unit, and stopping, when a normal result of detection is estimated by the estimation unit, supply of a power to the detection unit.

A third program according to the present invention is executed by a computer for controlling an information processing apparatus including a detection unit for detecting a physical quantity as a target for detection and a control unit for measuring the physical quantity based on a result of detection by the detection unit and also controlling supply of a power to the detection unit, and the program includes the steps of estimating a normal result of detection by the detection unit obtained after passage of a predetermined period of time after supply of a power to the detection unit is started based on a result of measurement of the physical quantity by the control unit; and providing controls for starting supply of a power to the detection unit, measuring the physical quantity based on a result of detection by the detection unit, and stopping, when a normal result of detection is estimated by the estimation unit, supply of a power to the detection unit.

A fourth information processing apparatus according to the present invention includes a plurality of detection units each for detecting a physical quantity as a target for detection; and a control unit for measuring the physical quantity based on a result of detection by one or more first detection units among the plurality of detection units and also controlling supply of a power to a second detection unit in response to a result of measurement of the physical quantity.

When supply of a power to the second control unit is started, the control unit can further measure a physical quantity based on a result of detection by the second detection unit.

The first detection unit may be designed to consume a power less as compared to the second detection unit.

The control unit may be designed to control supply of a power to the second detection unit based on the priority of the second detection unit set according to a result of measurement of the physical quantity.

The control unit may be designed to determine its own operating situation from a result of detection by the first detection unit and set the priority of the second detection unit so that higher priority is set for the second detection unit more required to operate in the determined situation.

The second detection unit may be designed to include a first positioning unit for executing positioning outdoors, and a second positioning unit for executing positioning indoors. In this configuration, the control unit sets, when it is determined from a dose of ultraviolet rays measured based on a result of detection by the first detection unit that the control unit is present outdoors, higher priority to the first positioning unit as compared to that to the second positioning unit, and controls supply of a power to the first and second positioning units so that positioning is executed only by the first positioning unit.

The control unit may be designed to control supply of a power to the first and second positioning units so that positioning is executed when a distance obtained by multiplying a speed measured based on a result of detection by the first detection unit by a cycle of positioning by the first or second positioning unit shows higher precision as computed to that in positioning by the first or second positioning unit.

The control unit may be designed to control supply of a power to the first positioning unit so that positioning is executed by the first positioning unit when a change in humidity measured based on a result of detection by the first detection unit is over a predetermined threshold value.

The first detection unit may be designed to include a first positioning unit for measuring illumination intensity and a second measuring unit for measuring a dose of ultraviolet rays. In this configuration, the control unit controls supply of a power to the second measuring unit so that measurement of a dose of ultraviolet rays is executed by the second measuring unit when illumination intensity over the predetermined threshold value is measured by the first measuring unit.

A fourth information processing apparatus according to the present invention further includes a storage unit for storing therein a period of time after measurement of a physical quantity by the control unit based on a result of detection by a third detection unit among the plurality of detection units is finished until measurement of the physical quantity is executed next as a standby period with the control unit shifted to the standby state during the period, and the control unit may be designed to repeat the processing for starting supply of a power to the third detection unit and measuring the physical quantity based on a result of detection by the third detection unit and the processing for stopping supply of a power to the third detection unit, shifting its own state to the standby state, and returning from the standby state after passage of the standby period.

The fourth information processing apparatus according to the present invention further includes a storage unit for storing therein a period of time after supply of a power to a third detection unit among the plurality of detection units is started until a normal result of detection by the third detection unit is obtained as a standby period with the control unit shifted to the standby state during the period, and the control unit may further be designed to start supply of a power to the third detection unit, shifts its own state to the standby state, returns from the standby state after passage of the standby period, and measures the physical quantity based on a result of determination by the third detection unit.

The fourth information processing apparatus according to the present invention further includes a storage unit for storing therein data indicating the physical quantity measured by the control unit, and the control unit may be designed to supply, when a predetermined volume of data indicating the physical quantity is obtained by the storage unit, the predetermined volume of data indicating the physical quantity to other control unit executing a predetermined processing.

A fourth information processing method according to the present invention is executed by an information processing apparatus including a detection unit for detecting a physical quantity as a target for detection, and the method includes the step of providing controls for measuring the physical quantity based on a result of detection by one or more first detection units among the plurality of detection units and also controlling supply of a power for a second detection unit according to a result of measurement of the physical quantity.

A fourth program according to the present invention is executed by a computer for controlling an information processing apparatus including a plurality of detection units each for detecting a physical quantity as a target for detection, and the program includes the step of providing controls for measuring the physical quantity based on a result of detection by one or more first detection units among the plurality of detection units and also controlling supply of a power for a second detection unit according to a result of measurement of the physical quantity.

In the first information processing apparatus, method and program each according to the present invention, repeatedly executed are the processing for starting supply of a power to the control unit and measuring a physical quantity based on a result of detection by the detection unit and the processing of stopping supply of a power to the detection unit, shifting the state of the control unit to the standby state, and returning from the standby state after passage of the standby period.

In the second information processing apparatus, method and program each according to the present invention, after supply of a power to the detection unit is started, the state of the control unit is shifted to the standby state and then the original state is restored after passage of the standby period, and measurement of a physical quantity is performed based on a result of detection by the detection unit.

In the third information processing apparatus, method and program each according to the present invention, after supply of a power to the detection unit is started, measurement of a physical quantity is performed based on a result of detection by the detection unit, and when a normal result of detection is estimated by the estimation unit based on a result of the measurement, supply of a power to the detection unit is stopped.

In the fourth information processing apparatus, method and program each according to the present invention, measurement of a physical quantity is performed based on a result of detection by one or more first detection units among a plurality of detection units, and supply of a power to the second detection unit is controlled based on the priority of the second detection unit set according to a result of measurement of the physical quantity.

With the present invention, power consumption can be reduced.

Further with the present invention, acquisition of an erroneous value as a result of sampling can be prevented.

Still further with the present invention, state transition can quickly be performed.

BRIEF DESCRIPTION OF THE DRAWINGS

FIG. 25 is a block diagram showing an example of configuration of a personal computer.

DETAILED DESCRIPTION OF THE PREFERRED EMBODIMENTS

Embodiments of the present invention are described below, and the correspondence between the inventions described in this specification and the embodiments is as described below. The description is provided to confirm that embodiments supporting the inventions described in claims respectively are described in this specification. Therefore, even if there is any embodiment described in "Detailed Description of the Embodiments" section but not described in this section, it does not always mean that the embodiment does not correspond to any invention. On the contrary, even if there is any embodiment described in this section as one corresponding to any invention, it does not always mean that the embodiment corresponds only to the specific invention.

Further, descriptions in this section are not intended to include all of the inventions described in this specification. In other words, descriptions in this section do not deny presence of inventions described in this specification but not claimed in this patent application, namely inventions which may be applied as a divided application, or added in amendment.

Figure 1:
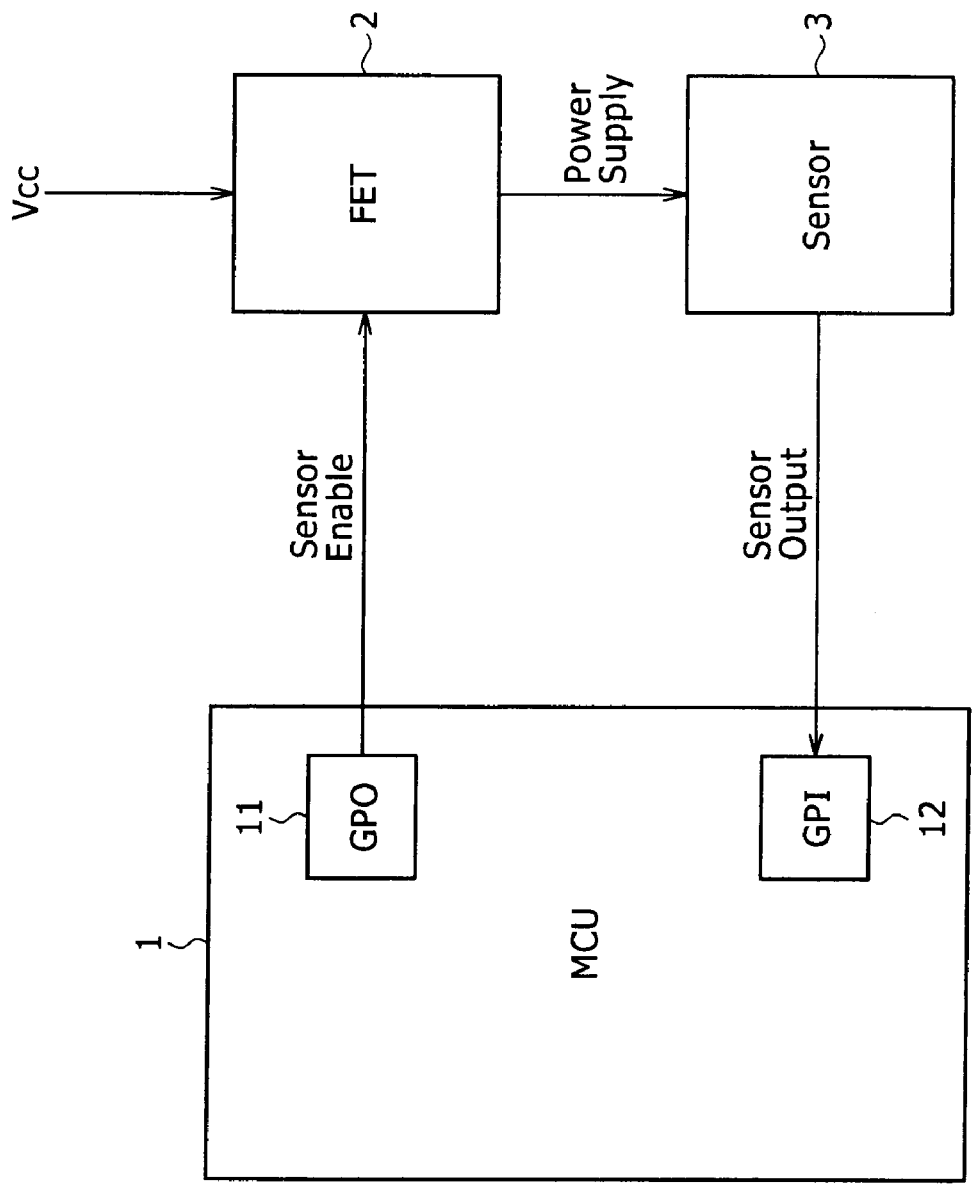
FIG. 1 is a block diagram showing an example of configuration of an information processing apparatus in which the present invention is applied.
Figure 3:
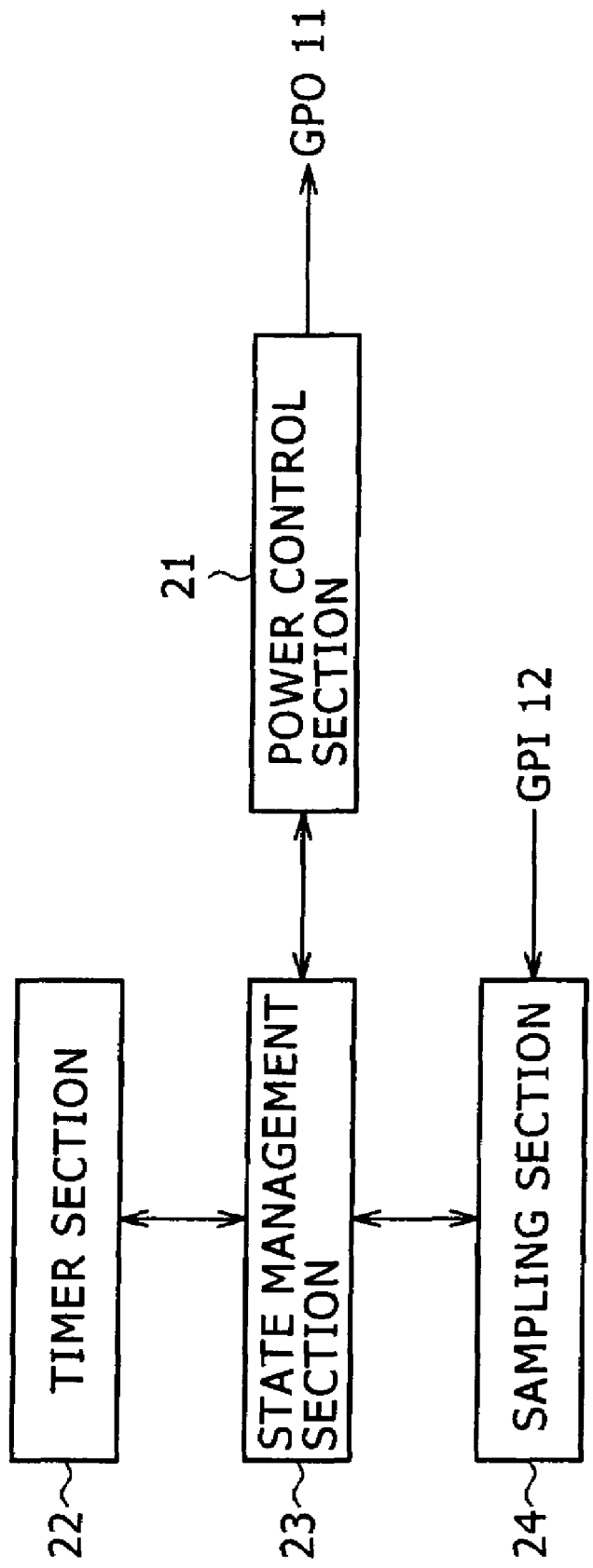
FIG. 3 is a block diagram showing an example of functional configuration of the MCU.

The information processing apparatus according to claim 1 includes a detection unit (for instance, sensor 3 in FIG. 1) for detecting a physical quantity as a target for detection; a first control unit (for instance, MCU 1 in FIG. 1 (Sub MCU 82 in FIG. 19)) for measuring the physical quantity based on a result of detection by the detection unit (for instance, sampling by a sampling section 24 shown in FIG. 3) and also controlling supply of a power to the detection unit (for instance, control of a power by a power control section 21 shown in FIG. 3); and a first storage unit (for instance, a timer section 22 shown in FIG. 3) for storing therein a period of time after measurement of the physical quantity by the first control unit is finished until measurement for the physical quantity is carried out next as a standby period (for instance, sleep state) with the first control unit shifted to the standby state during the period. Therefore, the first control unit repeats the processing of starting supply of a power to the detection unit and then measuring the physical quantity based on a result of detection by the detection unit and the processing for terminating supply of a power to the detection unit, shifting its own state to the standby state, and returning from the standby state after passage of the standby period (for instance, information processing apparatus executing an intermittent operation together with an MCU 1 and the sensor 3 according to a sampling cycle).

The information processing apparatus according to claim 2 further includes a second storage unit (for instance, a buffer 93 shown in FIG. 19) for storing therein data indicating the physical quantity measured by the first control unit. Therefore, the first control unit further supplies, when only a predetermined volume of data indicating the physical quantity is stored in the second storage unit, the predetermined volume of the data indicating the physical quantity to a second control unit (for instance, a Main MCU 81 in FIG. 19).

Figure 17:
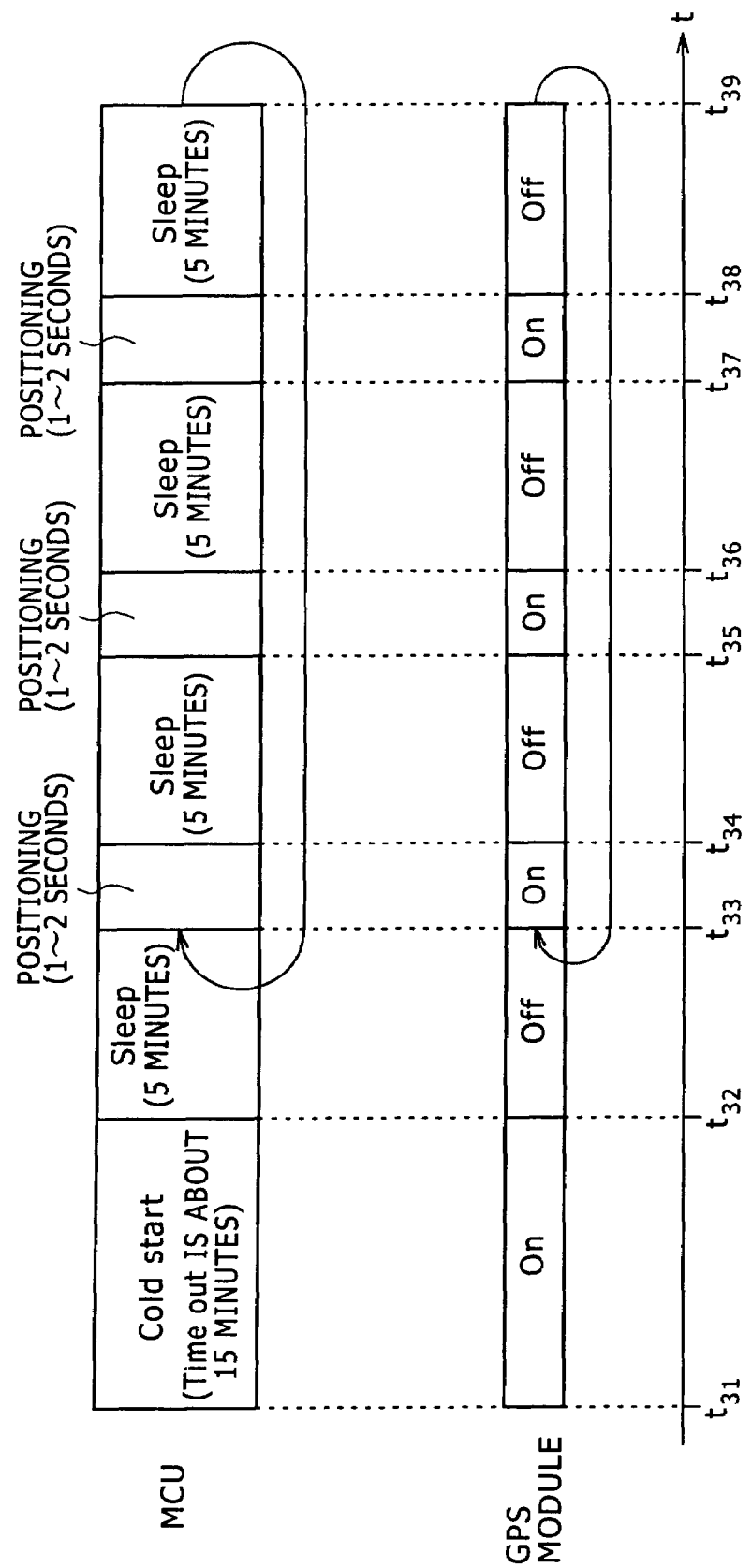
FIG. 17 is a view showing an example of an intermittent operation of the GPS module.

The information processing method according to claim 3 is executed by an information processing apparatus including a detection unit (for instance, the sensor 3 in FIG. 1) for detecting a physical quantity as a target for detection and a control unit (for instance, the MCU 1 (a Sub MCU 82 in FIG. 19)) for measuring the physical quantity based on a result of detection by the detection unit (for instance, sampling by the sampling section 24 in FIG. 3) and also controlling supply of a power to the detection unit (for instance, control of a power by the power control section 21 in FIG. 3), and the method includes the steps of storing a period of time after measurement of the physical quantity by the control unit is finished until measurement for the physical quantity is executed next as a standby period with the control unit shifted to the standby state (for instance, sleep state) during the period (for instance, step 44 in FIG. 5); and providing controls for repeating the processing of starting supply of a power to the detection unit and then measuring the physical quantity based on a result of detection by the detection unit and the processing for terminating supply of a power to the detection unit, shifting its own state to the standby state, and returning from the standby state after passage of the standby period (processing for shifting the operational state shown in FIG. 17).

Also in the program according to claim 4, the steps correspond to the same embodiments as those in the information processing method according to claim 3 (Note that the program according to claim 4 is only an example thereof).

The information processing apparatus according to claim 5 includes a detection unit (for instance, the sensor 3 in FIG. 1) for detecting a physical quantity as a target for detection; a control unit (for instance, the MCU 1 in FIG. 1) for measuring the physical quantity based on a result of detection by the detection unit (for instance, sampling by the sampling section 24 in FIG. 3) and also controlling supply of a power to the detection unit (power control by the power control section 21 in FIG. 3); and a storage unit (for instance, the timer section 22 in FIG. 3) for storing therein a period of time after measurement of the physical quantity by the first control unit is finished until measurement for the physical quantity is carried out next as a standby period with the first control unit shifted to the standby state during the period. Therefore, the control unit starts supply of a power to the detection to the detection unit, shifts its own state to the standby state (for instance, the sleep state), then returns from the standby state after passage of the standby period, and measures the physical quantity based on a result of detection by the detection unit (for instance, the information processing apparatus for shifting the operating state in FIG. 2).

Figure 2:
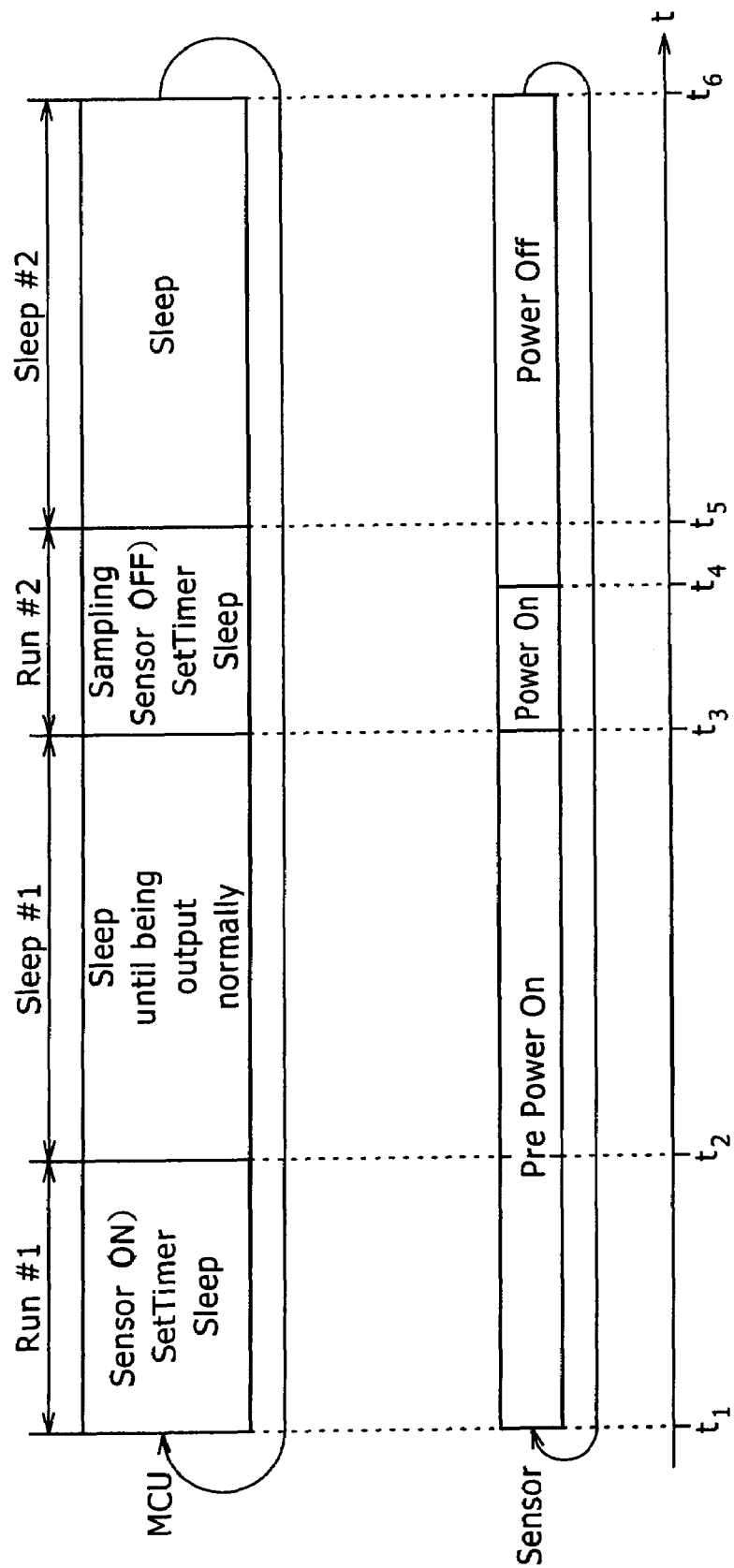
FIG. 2 is a view showing an example of state transition in an MCU and a sensor.

The information processing method according to claim 6 is executed by an information processing apparatus including a detection unit (for instance, the sensor 3 in FIG. 1) for detecting a physical quantity as a target for detection and a control unit (for instance, MCU 1 in FIG. 1) for measuring the physical quantity based on a result of detection by the detection unit (for instance, sampling by the sampling section 24 in FIG. 3) and also controlling supply of a power to the detection unit (for instance, power control by the power control section 21 in FIG. 3), and the method includes the step (for instance, step 44 in FIG. 5) of storing a period of time after supply of a power to the detection unit is started by the control unit until a normal result of detection by the detection unit is obtained as a standby period with the control unit shifted to the standby state (for instance, the sleep state) during the period; and the step (for instance, the processing for shifting the operating state in FIG. 2) of providing controls for starting supply of a power to the detection unit, shifting the control unit into the standby state, returning the control unit from the standby state after passage of the standby period, and measuring the physical quantity based on a result of detection by the detection unit.

Also in the program according to claim 7, the steps correspond to the same embodiments as those in the information processing method according to claim 6 (Note that the program according to claim 7 is only an example thereof).

The information processing apparatus according to claim 8 includes a detection unit (for instance, the sensor 3 in FIG. 1) for detecting a physical quantity as a target for detection; a control unit (for instance, the MCU 1 in FIG. 1) for measuring the physical quantity based on a result of detection by the detection unit (for instance, sampling by the sampling section 24 in FIG. 10) and also controlling supply of a power to the detection unit (for instance, power control by the power control unit 21 in FIG. 10); and an estimation unit (for instance, the estimation section 31 in FIG. 10) for estimating a normal result of detection by the detection unit obtained after passage of a predetermined period of time after supply of a power to the detection unit is started based on a result of measurement of the physical quantity by the control unit. Therefore, the control unit starts supply of a power to the detection unit, measures the physical quantity based on a result of detection by the detection unit, and stops, when a normal result of detection is estimated by the estimation unit, supply of a power to the detection unit.

Figure 8:
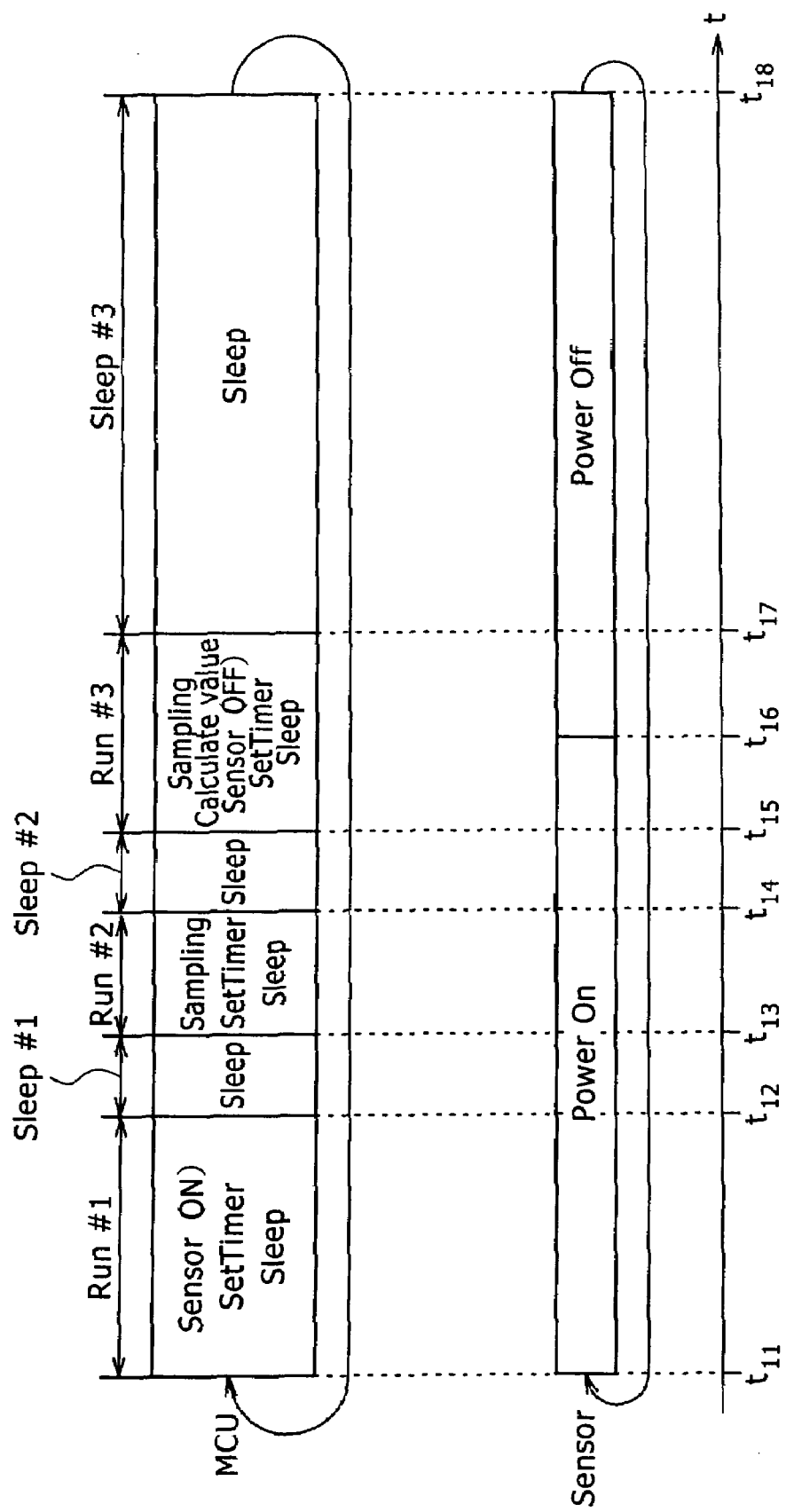
FIG. 8 is a view showing another example of state transition in the MCU and a sensor.
Figure 10:
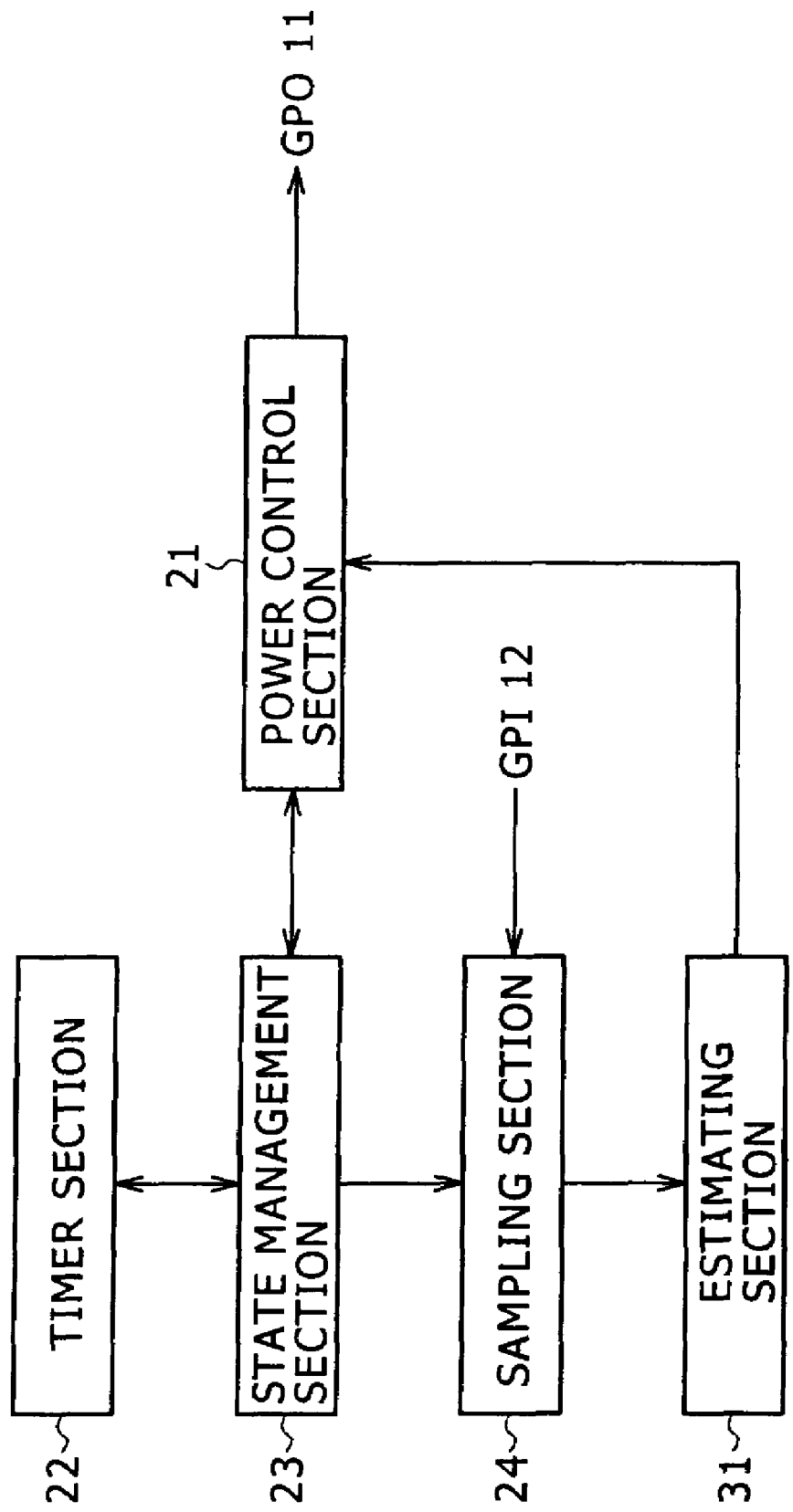
FIG. 10 is a block diagram showing another example of functional configuration of the MCU.

The information processing method according to claim 10 is executed by an information processing apparatus including a detection unit (the sensor 3 in FIG. 1) for detecting a physical quantity as a target for detection and a control unit (for instance, the MCU 1 in FIG. 1) for measuring the physical quantity based on a result of detection by the detection unit (for instance, sampling with the sampling section 24 in FIG. 10) and also controlling supply of a power to the detection unit (for instance, power control by the power control section 21 in FIG. 10), and the method includes the step of estimating a normal result of detection by the detection unit obtained after passage of a predetermined period of time after supply of a power to the detection unit is started based on a result of measurement of the physical quantity by the control unit (for instance, step S94 in FIG. 1); and the step of providing controls for starting supply of a power to the detection unit, measuring the physical quantity based on a result of detection by the detection unit, and stopping, when a normal result of detection is estimated by the estimation unit, supply of a power to the detection unit (for instance, the processing for shifting the operating state shown in FIG. 8).

Also in the program according to claim 11, the steps correspond to the same embodiments as those in the information processing method according to claim 10 (Note that the program according to claim 11 is only an example thereof).

The information processing apparatus according to claim 12 includes a plurality of detection units (for instance, the GPS module 51 to the UV ray sensor 57 in FIG. 12) each for detecting a physical quantity as a target for detection; and a control unit (for instance, the MCU 1 in FIG. 12) for measuring the physical quantity based on a result of detection by one or more first detection units (for instance, the illumination sensor 56) among the plurality of detection units and also controlling supply of a power to a second detection unit in response to a result of measurement of the physical quantity.

The second detection unit of the information processing apparatus according to claim 17 includes a first positioning unit for executing positioning outdoors (for instance, the GPS module 51 in FIG. 12), and a second positioning unit (for instance, the PHS module 52 in FIG. 12) for executing positioning indoors; and the control unit sets, when it is determined from a dose of ultraviolet rays measured based on a result of detection by the first detection unit that the control unit is present outdoors, higher priority to the first positioning unit as compared to that to the second positioning unit, and controls supply of a power to the first and second positioning units so that positioning is executed only by the first positioning unit.

The first detection unit of the information processing apparatus according to claim 20 includes a first measuring unit (for instance, the illumination sensor 56 in FIG. 12) for measuring illumination intensity and a second measuring unit (for instance, the UV ray sensor 57 in FIG. 12) for measuring a dose of ultraviolet rays; and the control unit controls supply of a power to the second measuring unit so that measurement of a dose of ultraviolet rays is executed by the second measuring unit when illumination intensity over the predetermined threshold value is measured by the first measuring unit.

The information processing apparatus according to claim 22 further includes a storage unit (for instance, the timer section 22 in FIG. 3) for storing therein a period of time after supply of a power to the third detection unit among the plurality of detection units is started by the control unit until a normal result of detection by the detection unit is obtained as a standby period with the control unit shifted to the standby state (for instance, the sleep state) during the period. Therefore, the control unit starts supply of a power to the third detection unit, shifts its own state to the standby state, and returns from the standby state after passage of the standby period, and measures the physical quantity based on a result of detection by the third detection unit.

The information processing apparatus according to claim 23 further includes a storage unit (for instance, the buffer 93 in FIG. 19) for storing therein data indicating the physical quantity measured by the control unit. Therefore, the control unit supplies, when only a predetermined volume of data indicating the physical quantity is obtained by the storage unit, the predetermined volume of data indicating the physical quantity to other control unit executing a predetermined processing (for instance, the Main MCU 81 in FIG. 19).

Figure 13:
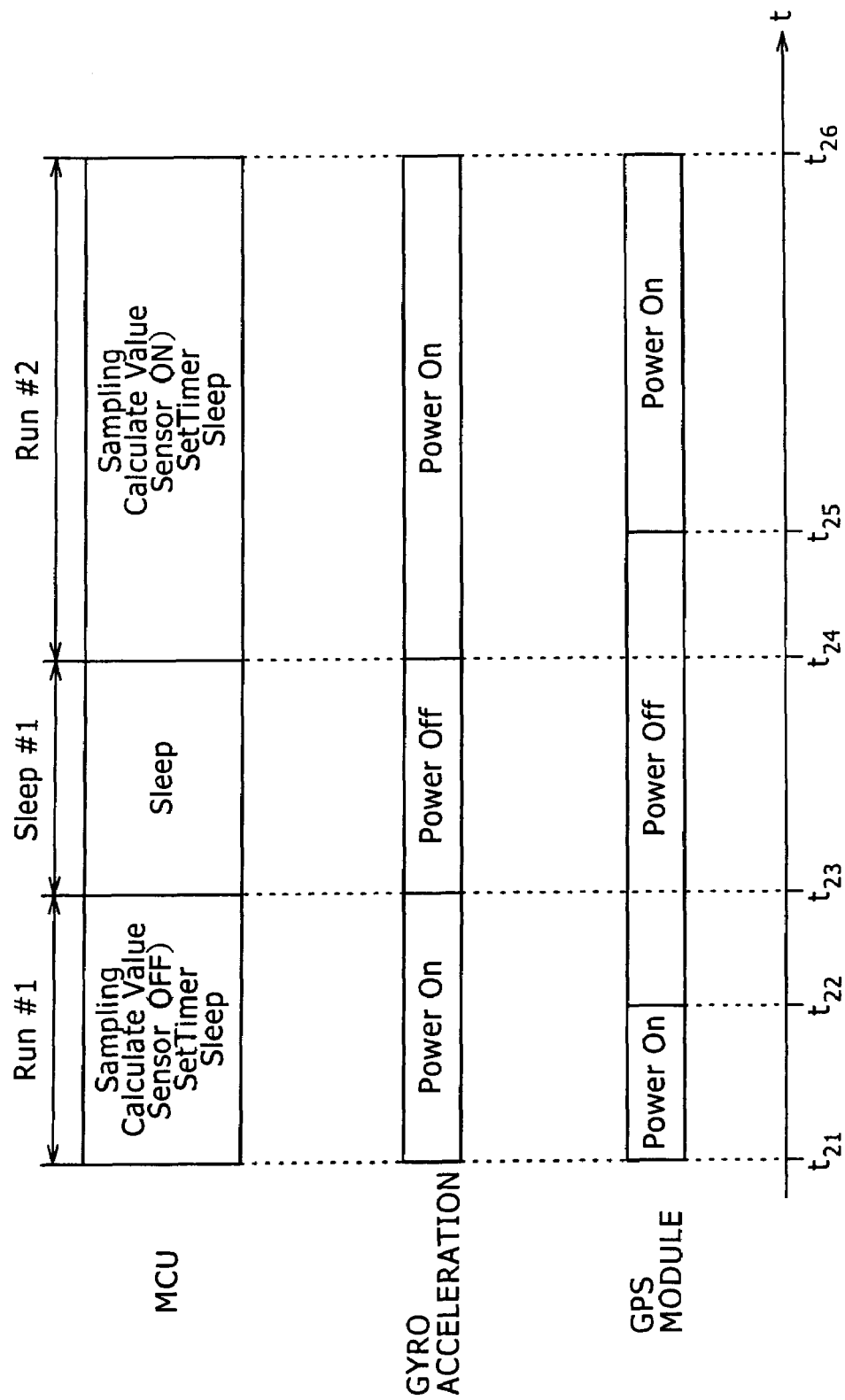
FIG. 13 is a view showing an example of state transition in the MCU, a gyro, an acceleration sensor, and a GPS module.

The information processing method according to claim 24 is executed by an information processing apparatus including a plurality of detection units each for detecting a physical quantity as a target for detection, and the method includes the step of providing controls (for instance, the processing for shifting the operating state in FIG. 13) for measuring the physical quantity based on a result of detection by one or more first detection units (for instance, the illumination sensor 56) among the plurality of detection units and also controlling supply of a power for a second detection unit according to a result of measurement of the physical quantity.

Also in the program according to claim 25, the steps correspond to the same embodiments as those in the information processing method according to claim 24 (Note that the program according to claim 25 is only an example thereof).

Embodiments of the present invention are described below with reference to the related drawings.

FIG. 1 is a block diagram showing an example of configuration of an information processing apparatus in which the present invention is applied.

The information processing apparatus shown in FIG. 1 is, for instance, a mobile telephone or a PDA (Personal Digital Assistant), or a portable device such as a compact personal computer (or a portion thereof).

The MCU (Micro Controller Unit) 1 is a one-chip micro computer which develops, for instance, an application previously prepared on a RAM (Random Access Memory) inside thereof and controls operations of the entire information processing apparatus.

The MCU 1 shows ON/OFF (energized/not energized) of an FET (Field Effect Transistor) 2 according to a signal (sensor enable signal) outputted from a GPO (General Purpose Output) terminal 11, and controls supply of a power Vcc to a sensor 3. Further the MCU 1 executes sampling of a signal (a sensor output signal) inputted from the operating sensor 3 with a power Vcc supplied thereto to a GPI (General Purpose Input) terminal 12 (measurement of a physical quantity).

The FET 2 supplies a power Vcc to the sensor 3 according to a signal inputted from the MCU 1.

The sensor 3 operates only while the power Vcc is being supplied via the FET 2, and outputs a signal indicating a result of detection to the GPI terminal 12 of the MCU 1. The sensor 3 is any of a temperature sensor, a humidity sensor, an air pressure sensor, an illumination sensor, an UV ray sensor, a gyro sensor, an acceleration sensor, and the like.

Further the sensor 3 may be any of a GPS (Global Positioning System) module, a PHS (Personal Handy Phone) module, a radio LAN (Local Area Network) module based on the standard such as the IEEE (Institute of Electrical and Electronics Engineers) 802.11a,b,g, or a communication module such as Bluetooth (Registered trade mark), and display module such as LCD (Liquid Crystal Display), and an image pick-up module such as a CCD (Charge Coupled Device). That is, any module may be employed so long as the module operates with a certain cycle.

In the information processing apparatus having the configuration as described above, to reduce the power consumption, controls are provided for supply of a power Vcc to the sensor 3 and the operation state of the MCU 1 itself.

FIG. 2 is a view showing state transition of the MCU 1 as well as of the sensor 3.

As shown in FIG. 2, the operating state of the MCU 1 is divided to the run state and the sleep state, and the MCU 1 repeats the two operating states. That is, an intermittent operation is executed.

Herein the run state indicates the state in which a specified task is executed and controls, for instance, over supply of a power Vcc to the sensor 3.

The sleep state is the state in which power consumption is less than that in the run state. In the sleep state, when an interruption is made according to the timing set in a timer during the run state, the run state is restored.

The sleep state has the following different two meanings according to a type of OS (Operating System) executed by the MCU 1.

For instance, when the OS executed by the MCU 1 is a non-real time OS, the sleep state indicates a state in which a clock speed is lowered and execution of programs excluding those of the minimum required input/output management is stopped.

When an OS executed by the MCU 1 is a real time OS ensuring that, when an event occurs, the event handler is activated within a predetermined period of time, the sleep state indicates termination of a task being executed. Therefore, in this case, restoration from the sleep state indicates a processing for waking the task.

When the real time OS is used, as a result of interruption of a task, execution of another task is enabled, and if code instructing a task with the lowest priority to shift to the sleep state like in the case of the non-real time OS is described in the task, shift to the sleep state is executed when there is no task to be executed.

Again in FIG. 2, the MCU 1 having started the state of Run MCU 1 at the time point $t_1$ turns ON the FET 2 to start supply of a power Vcc to the sensor 3.

At this point of time, the sensor 3 is set in the pre power ON state, and starts output of a signal indicating a result of detection. In FIG. 2, the time of point when the sensor 3 is set in the pre power ON state is time point $t_1$, but to describe accurately, the time of point is slightly delayed from the time point $t_1$.

This "pre power ON state" is a state before the power On state in which a normal result of detection can be outputted. In this state, the sensor 3 can operate because the power Vcc is being supplied thereto, but the sensor 3 cannot normally output a result of detection.

Therefore, until the time point t3 when the sensor 3 is enabled to normally output a result of detection, the timer is set, and then the sensor shifts its own operating state to the state of Sleep #1. In FIG. 2, the state of Sleep #1 is started at the time point $t_2$. In the state of Sleep #1, a value for the GPO terminal 11 is preserved, and supply of the power Vcc to the sensor 3 is continued.

The MCU 1 returns to the state of Run #2 upon interruption by the timer generated at the time point $t_3$, and executes sampling for an output from the sensor 3 for the first time. That is, sampling for an output from the sensor 3 in the pre power ON state is not executed. At the time point $t_3$ and on, the sensor 3 is in the power ON state, so that the MCU 1 can obtain a normal value by sampling.

After sampling for an output from the sensor 3 is executed, the MCU 1 turns OFF the FET 2 at the time point $t_4$, and stops supply of the power Vcc to the sensor 3. With this, the sensor 3 enters the power OFF state with the operation stopped.

After the sensor 3 is turned OFF, the MCU 1 sets the timer, and sets its own operating state again in the sleep state.

With this operation, the MCU 1 enters the state of Sleep #2 at the time point $t_5$, and preserves the state until the time point $t_6$ when an interruption by the timer set in the state of Run #2 is generated. At the time point $t_6$ and on, state transition from the time point $t_1$ is again repeated.

Some sensors cannot normally output a result of detection after supply of the power Vcc is started until a predetermined period of time passes. If any of the sensors as described is used, the operating state of the MCU 1 is shifted to the sleep state and the state is maintained until normal output of detection is started. Thus, it is possible to reduce power consumption by the MCU 1 in proportion to the period of time in the sleep state. Further it is possible to prevent an incorrect value from being sampled and fetched.

Further as also the sensor 3 is deactivated immediately after a normal value is obtained by sampling (at the time point $t_4$ in FIG. 2), power consumption by the sensor 3 is reduced more as compared to the case in which the sensor 3 is kept activated until sampling is carried out next.

Further power consumption in the entire device is reduced, even when the device is operated for the same period of time, the information processing apparatus can be run with a battery with a smaller capacity as a power supply for the device. This enables not only cost reduction, but also size reduction of the device body.

Operations of the MCU 1 for reducing power consumption are described in detail below with reference to a flow chart.

FIG. 3 is a block diagram showing an example of functional configuration of the MCU 1. At least a portion of the function block in FIG. 3 is realized by execution of a specific program by the MCU 1.

A power control section 21 turns ON or OFF the FET 2 according to a signal outputted from the GPO terminal 11 under control by a state management section 23.

A timer section 22 manages a timer and generates an interruption to the state management section 23 at a time point set by the state management section 23. In response to this interruption, the state management section 23 restores the MCU 1 from the sleep state, and executes the subsequent processing steps.

The state management section 23 manages state transition of the MCU 1. Further the state management section 23 executes the processing such as setting a time point when the run state is to be restored next while the MCU 1 is in the run state.

A sampling section 24 executes sampling for a signal (indicating a result of detection by the sensor 3) inputted into the GPI terminal 12. The data obtained by sampling is outputted, for instance, to other function block not shown and is used for a predetermined process therein.

Figure 4:
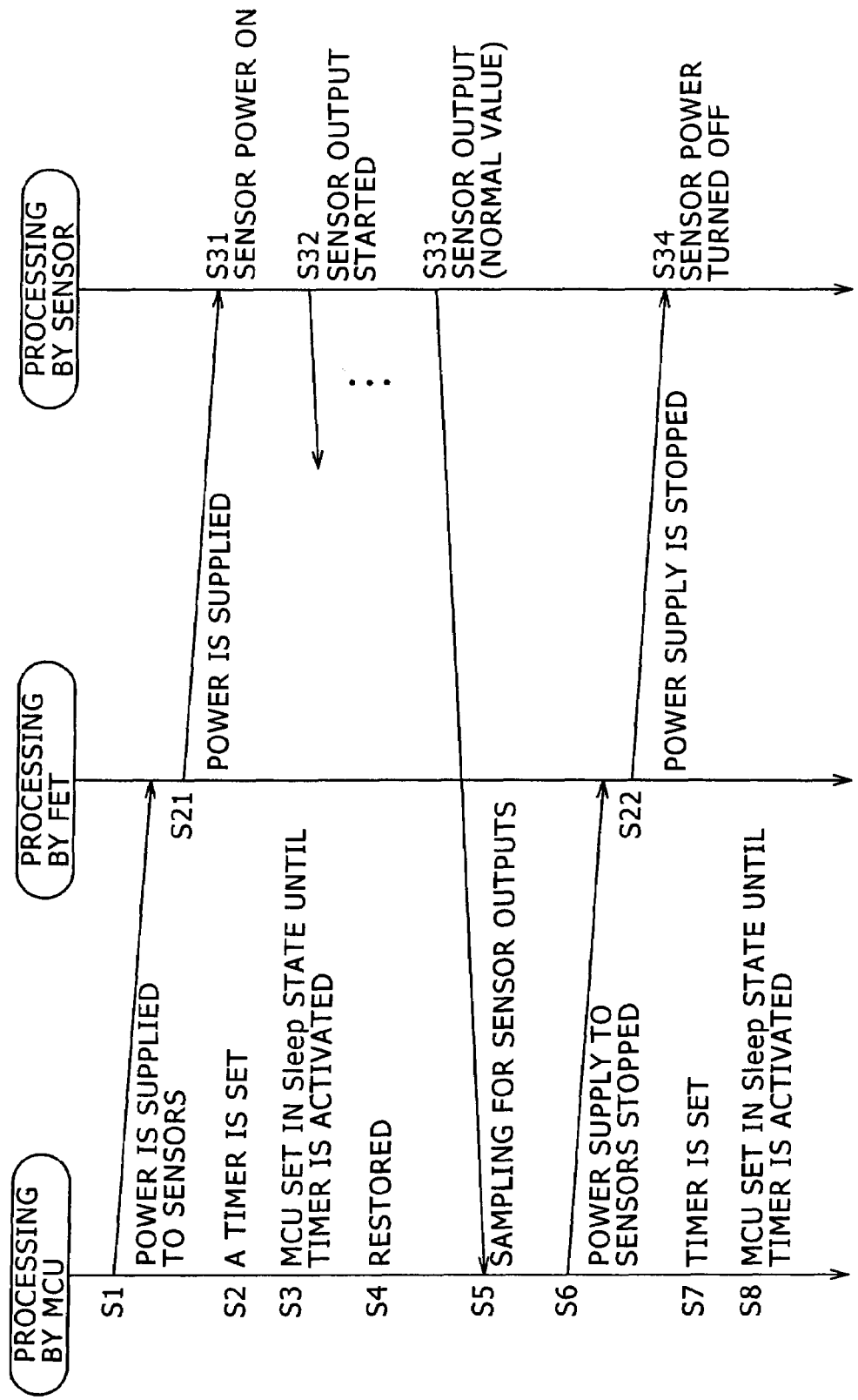
FIG. 4 is a sequence diagram for illustrating a sequence of operations of the MCU, an FET, and a sensor.

A sequence of operations in the MCU 1, FET 2, and sensor 3 shown in FIG. 1 are described with reference to the sequence diagram shown in FIG. 4.

In step S1, the MCU 1 turns ON the FET 2 according to a signal outputted from the GPO terminal 11 to start supply of a power Vcc to the sensor 3.

After supply of the power Vcc to the sensor 3 is started, in step S2, the MCU 1 sets a time point for returning to the run state, shifts to step S3, and enters and stays in the sleep state until the set time is activated (or until generation of an interruption). At this point of time, for instance the state of Sleep #1 shown in FIG. 2 is started.

On the other hand, the FET 2 having received the signal outputted in step S1 from the MCU 1 energizes a section between a source and a drain in step S21 to start supply of the power Vcc to the sensor 3. The state in which the section between the source and drain has been energized is preserved according to a signal sent from the MCU 1.

The sensor 3 starts running in step S31 in which supply of the power Vcc to the sensor 3 is started (when the power is turned ON), and starts output of a result of detection to the MCU 1 in step S32. As the result of detection outputted in this step is outputted in the pre power ON state shown in FIG. 2 immediately after the operation of the sensor 3 is started, so that the result of detection is not normal. Sampling for a result of detection is not performed in the MCU 1.

Output from the sensor 3 (output of a result of detection not being normal) is repeated with a predetermined cycle, and when output of a normal result of detection is enabled in step S33 (when the power ON state is effected at the time point $t_3$ in FIG. 2), the MCU1 performs sampling for the first time.

In step S4, the MCU 1 is restored from the sleep state in response to activation of the timer having been set (for instance, to the state of Run #2), shifts to step S5, and executes sampling for a result of detection outputted from the sensor 3.

After sampling for a normal result of detection sent from the sensor 3 is finished, in step S6, the MCU 1 turns OFF the FET 2, and stops supply of the power Vcc to the sensor 3.

The MCU 1 sets the timer in step S7, goes to step S8, and enters the sleep state again. With this operation, the MCU 1 is kept in the state of, for instance, Sleep #2 shown in FIG. 2 until the timer is activated.

On the other hand, the FET 2 having received a signal from the MCU 1 sets the source-drain section in the nonconductive state to stop supply of the power Vcc to the sensor 3.

In step S34 where supply of the power Vcc to the sensor 3 is stopped, the sensor 3 stops the operation. The sensor 3 is thus preserved, for instance, in the power OFF state shown in FIG. 2 until the power Vcc is supplied next time.

The processing by the MCU 1, FET 2, and sensor 3 is repeated, and intermittent operations by the MCU 1 and sensor 3 are realized, so that power consumption by the MCU 1 and sensor 3 is reduced.

Next operations of the MCU 1 are described with reference to the flow charts shown in FIG. 5 and FIG. 6.

Figure 5:
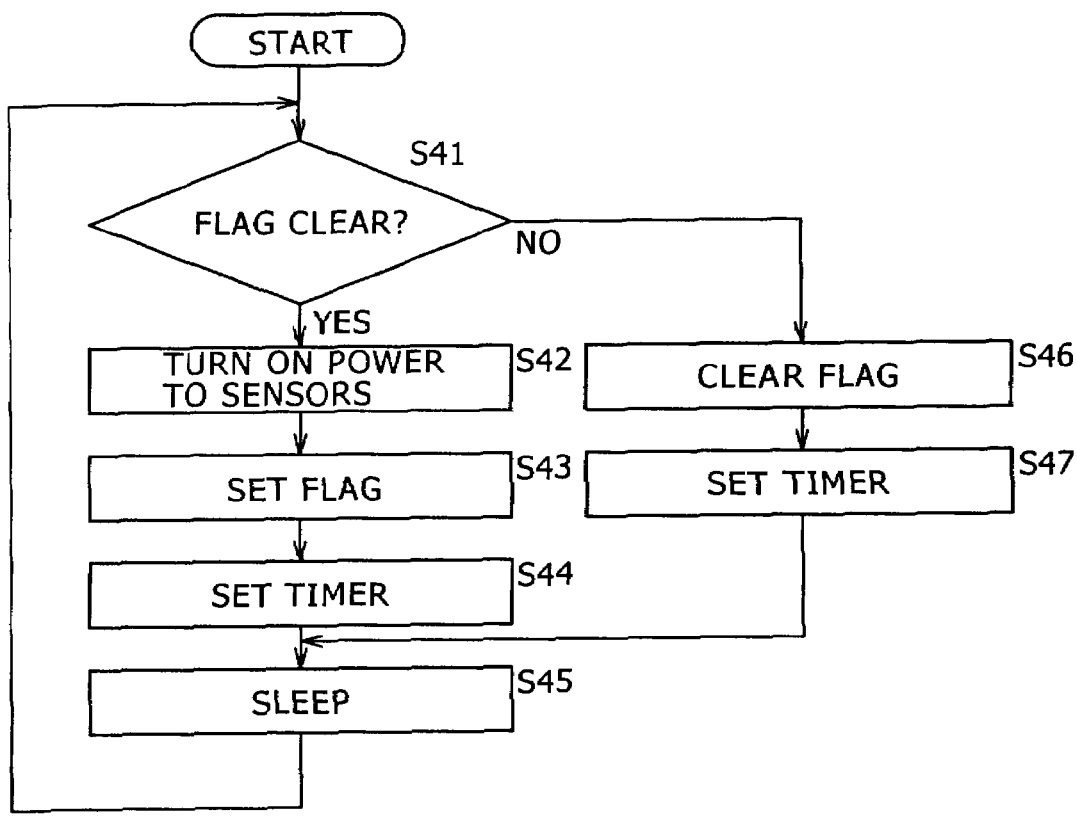
FIG. 5 is a flow chart for illustrating the processing by the MCU in the Run state.
Figure 6:
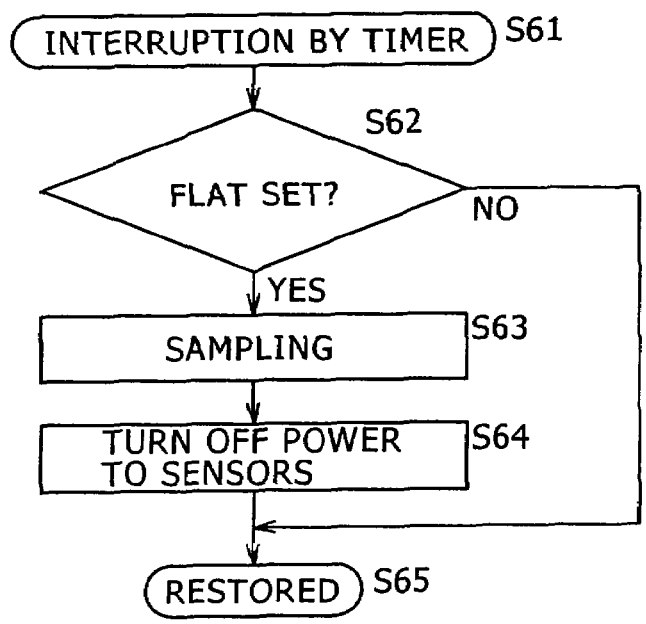
FIG. 6 is a flow chart for illustrating the processing of the MCU by executing an interrupt handler.

FIG. 5 is a flow chart showing the processing executed by the MCU 1 in the run state.

The state management section 23 in the MCU 1 determines, in step S41, whether or not the flag under management thereby is clear. This flag indicates that the power for the sensor 3 is ON when the flag is set, and also that the power for the sensor 3 is OFF when the flag is clear.

When it is determined in step S41 that the flag is clear (the power for the sensor 3 is OFF), the state management section 23 goes to step S42 and turns ON the power for the sensor 3. In other words, the state management section 23 controls the power control section 21 to turn ON the FET 2 so that a signal is outputted from the GPO terminal 11.

In step S43, the state management section 23 sets the flag, goes to step S44, and then sets the time point when an interruption is to be generated. After the timer is set, the state management section 23 sets the operating state of the MCU 1 in the sleep state in step S45. When the interruption is generated, the processing shown in FIG. 6 is terminated, and when the state before the sleep state is effected is restored, the processing in step S41 and on is repeated.

On the other hand, when it is determined in step S41 that the flag is not clear (that the power to the sensor 3 is ON and the flag is set), the state management section 23 goes to step S46 to clear the flat. For instance, when the sampling (processing in step S63) is executed in the processing described hereinafter and shown in FIG. 6 is executed and then the state management section 23 returns to the processing shown in FIG. 5, it is determined in step S41 that the flag is not clear.

In step S47, the state management section 23 sets the timer, goes to step S45, and enters the sleep state.

Then the processing by the MCU 1 realized when the interruption handler is executed is described with reference to the flow chart shown in FIG. 6.

When an interruption from the timer section 22 is generated in step S61, the state management section 23 activates the MCU 1 from the sleep state, and determines in step S62 whether or not the flag is clear.

When it is determined in step S62 that the flag is not set, the state management section 23 skips the processes in step S63 and step S64 described hereinafter, and is activated in step S65. With this operation, the processing shown in FIG. 5 is started.

On the other hand, when it is determined in step S62 that the flag is set, the state management section 23 goes to step S63 and makes a sampling section 24 sample a result of detection by the sensor 3. The interruption in step S61 is set so that the interruption is generated at the time point when the sensor 3 starts outputting a normal result of detection, and therefore a normal value is acquired by the sampling in this step.

In step S64, the state management section 23 controls the power control section 21 to output a signal for turning OFF the FET 2 for stopping supply of the power Vcc to the sensor 3. Then the state management section 23 goes to step S65, and restores the operating state of the MCU 1 from the state for execution of the interruption handler.

Descriptions above assume the case where supply of the power Vcc to the sensor 3 is continued until output of a normal result of detection is started, but in some cases, a value for a normal result of detection is estimated from an abnormal result of detection outputted before output of a normal result of detection is started.

In this case, therefore, an output from the sensor 3 indicating an abnormal result of detection is sampled a predetermined number of times, and when a value for a normal result of detection can be estimated based on a result of this sampling, the supply of the power Vcc to the sensor 3 may be stopped even before output of a normal result of detection is started.

With this configuration, a period of time for supply of the power Vcc to the sensor 3 can be made shorter as compared to a case in which supply of the power Vcc is continued until output of a normal result of detection is actually started. That is, power consumption by the sensor 3 can be reduced.

Figure 7:
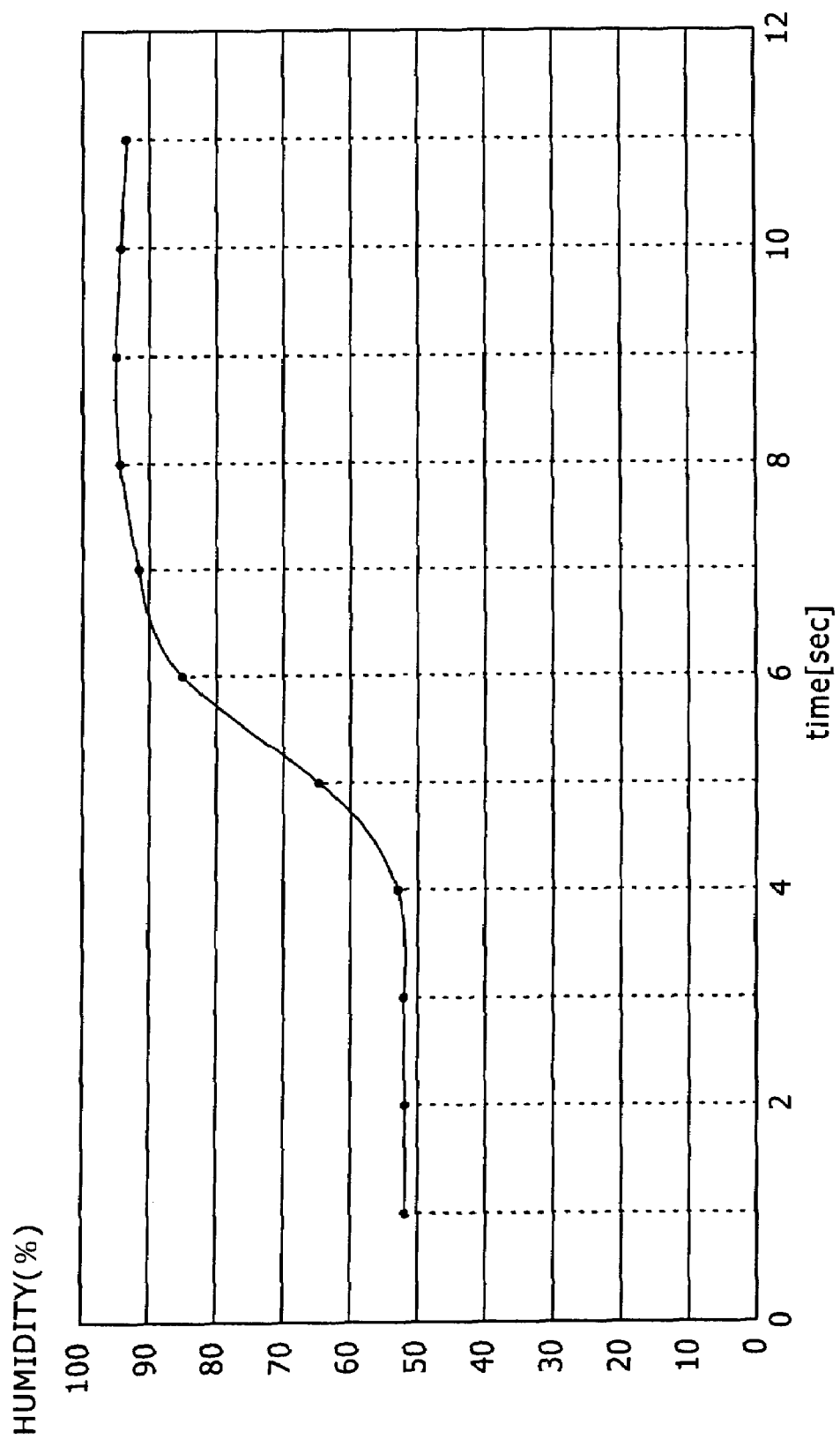
FIG. 7 is a view showing an example of temporal change of humidity outputted by a humidity sensor.

FIG. 7 is a view showing transition of a humidity outputted from a humidity sensor.

A horizontal axis in FIG. 7 indicates time (second), while the vertical axis indicates humidity (%). In the example shown in FIG. 7, a value is outputted (measured) once for every second.

After measurement (power supply) is started, a humidity of around 50% is outputted for a period from 1 second to 4 seconds after start of power supply, and then values providing a curve when the values are connected with lines are outputted after the initial period described above until 8 seconds after start of power supply. In 8 seconds after start of power supply and on, a substantially constant value is outputted.

Assuming herein that the humidity value of around 95% at 8 seconds after start of measurement is a normal value, a normal value outputted in 8 seconds after start of measurement can be estimated from results of sampling performed in 5 seconds, 6 seconds, and 7 seconds after start of power supply as well as the performance of this humidity sensor. For instance, when sampling performed in 7 seconds after start of measurement is finished, supply of the power Vcc to the humidity sensor is stopped.

With this configuration, as compared to the case in which power supply is continued until 8 seconds after start of measurement, power consumption by the humidity sensor can be reduced by a rate corresponding to 1 second.

It is needless to say that the power control as described above can be applied to any type of sensor such as a temperature sensor other than the humidity sensor as described above on the condition that the sensor can output an estimated value for a normal result of detection based on a result of sampling performed before output of a normal result of detection is started.

FIG. 8 is a view showing state transition of the MCU 1 as well as of the sensor 3 (a sensor having the output performance enabling estimation of a value for a normal result of detection from a result of sampling performed before output of a normal result of detection is started).

As shown in FIG. 8, the MCU 1 executes intermittent operations and changes the operating state from Run #1, Sleep #1, Run #2, Sleep #2, Run #3, Sleep #3 . . . .

In the state of Run #1 effected at the time point $t_{11}$, the MCU 1 turns ON the power for the sensor 3 and sets a timer, and then changes the operating state of its own to the state of Sleep #1 at the time point t12. In response to control by the MCU 1, also the sensor 3 is turned ON at the time point $t_{11}$.

In the state of Run #2 effected in response to an interruption generated at the time point $t_{13}$, the MCU 1 executes sampling for an output from the sensor 3 and sets the timer, and then at the time point $t_{14}$, the MCU 1 changes the operating state of its own to the state of Sleep #2. The value obtained by sampling performed in the state of Run #2 does not indicate a normal value yet. A result of sampling expressed by a value that is not normal is temporally stored in a buffer.

In the state of Run #3 effected in response to an interruption generated at the time point $t_{15}$, the MCU 1 executes sampling for an output from the sensor 3, and estimates a value for a normal result of detection based on the obtained result of sampling as well as on the sampling result stored in the buffer and the performance of the sensor 3. That is, in the example shown in FIG. 8, a value of a normal result of detection is estimated from the result of sampling executed twice, namely in the state of Run #2 and in the state of Run #3.

When estimation of a normal result of detection is finished, the MCU 1 turns OFF power for the sensor 3, sets a timer, and changes the operating state of its own to the state of Sleep #3. In response to control by the MCU 1, also the sensor 3 is deactivated at the time point $t_{16}$ (the power turned OFF).

Figure 9:
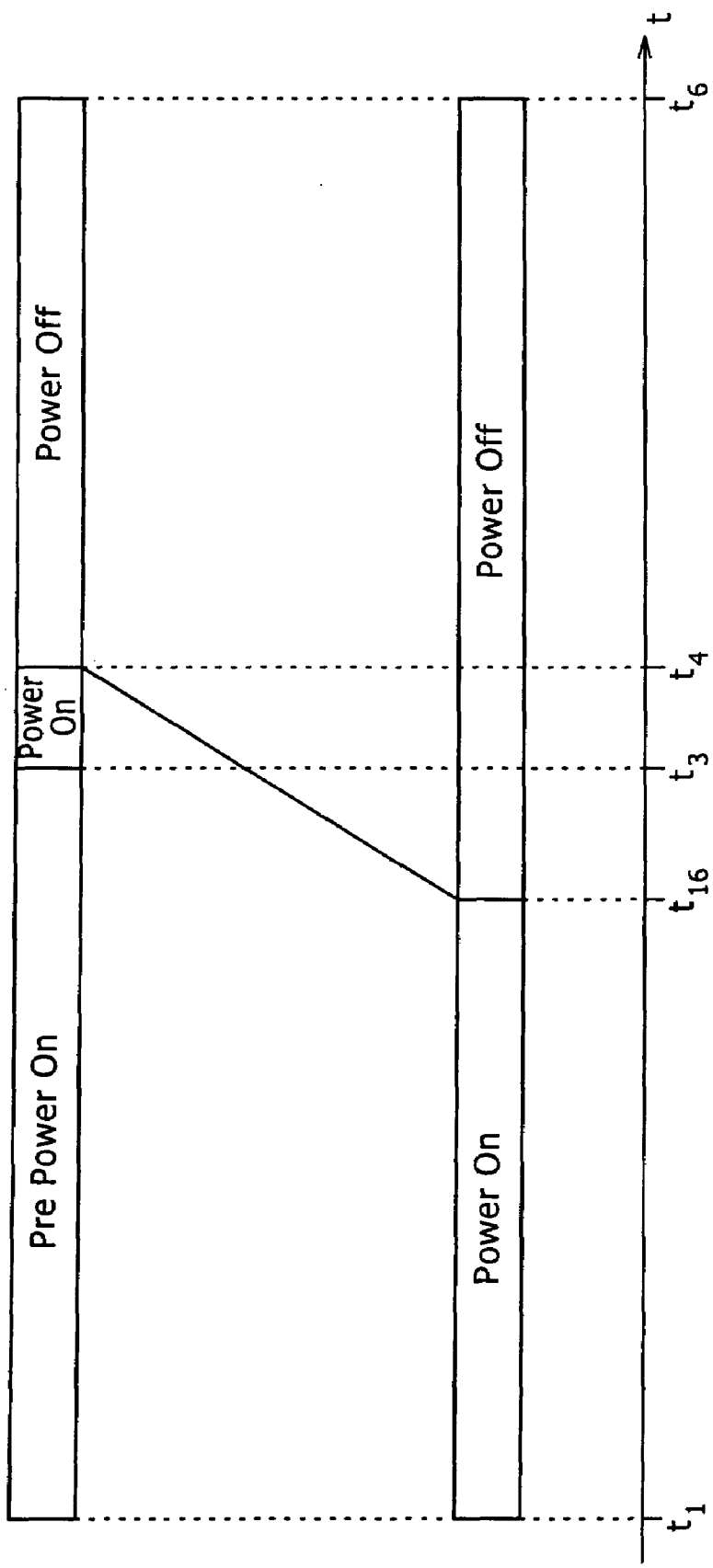
FIG. 9 is a view showing the effect when the state transition shown in FIG. 8 is employed.

FIG. 9 is a view showing the effect provided when the operational states of the MCU 1 and sensor 3 are shifted as shown in FIG. 8.

In FIG. 9, the upper row shows transition of the operational state of the sensor 3 shown in FIG. 2, while the lower row shows transition of the operational state of the sensor 3 shown in FIG. 8. The time plotted along the horizontal axis in FIG. 9 is based on the time shown in FIG. 2.

As shown in the upper row in FIG. 9, when the operational state shifts as shown in FIG. 2, the power Vcc is supplied to the sensor 3 from the time point $t_1$ until the time point $t_4$, but when the operational state shifts as shown in FIG. 8, supply of the power Vcc to the sensor 3 is continued from the time point $t_1$ until the time point $t_{16}$ (See FIG. 8) before time point $t_4$.

That is, the time for supply of the power Vcc to the sensor 3 is shortened by a rate corresponding to a period of time from time point $t_{16}$ to time point $t_4$. In FIG. 9, the period of time from time point $t_1$ to time point $t_6$ corresponds to the period of time from time point $t_{11}$ to time point $t_{18}$, while the period of time from time point $t_1$ to time point $t_{16}$ corresponds to the period of time from time point $t_{11}$ to time point $t_{16}$ shown in FIG. 8.

In the case as shown in FIG. 8, where the a value for a normal result of detection is estimated from a result of sampling performed up to the point of time and supply of the power Vcc to the sensor 3 is stopped according to the value, power consumption by the sensor 3 can be reduced, but the MCU 1 is activated more (and a period of running time thereof becomes longer) as compared to the case in which the sleep state is preserved until the sensor 3 starts outputting a normal value as shown in FIG. 2.

Therefore, the state transition shown in FIG. 8 may be allowable only when a quantity of consumed power reduced by shortening the period of supply of the power Vcc to the sensor 3 is larger than a quantity of consumed power increased by prolonging the run state of the MCU 1 as expressed by the following equation:

$$(a-b)*c>=d*e$$

wherein "a" indicates a total quantity of consumed power in the run state of the MCU 1 in the case where the state transition shown in FIG. 2 is employed. That is, "a" indicates a value obtained by multiplying the time obtained by adding the time $(t_2-t_1)$ for the Run #1 to the time $(t_5-t_3)$ for the Run #2 state in FIG. 2 by the power consumption by the MCU 1 in the run state.

In the equation above, "b" indicates a total quantity of consumed power by the MCU 1 in the sleep state in the case where the state transition in FIG. 2 is employed. That is, "b" indicates a value by multiplying the time obtained by adding the time $(t_3-t_2)$ for the Sleep #1 to the time $(t_6-t_5)$ for the Sleep #2 state in FIG. 2 by the power consumption by the MCU 1 in the sleep state.

In the equation above, "c" indicates a prolonged period of time for the run state of the MCU 1 when the state transition shown in FIG. 8 is employed as compared to that when the state transition shown in FIG. 2 is employed. That is, "c" indicates a value obtained by subtracting the time $(t_2-t_1)$ for the Run #1 and time $(t_5-t_3)$ for the Run #2 state in FIG. 2 from a sum of the time $(t_{12}-t_{11})$ for the Run #1, the time $(t_{14}-t_{13})$ for the Run #2 state, and the time the $(t_{17}-t_{15})$ for the Run #3 state in FIG. 8.

In the equation above, "d" indicates consumed power by the sensor 3.

In the equation above, "e" indicates the time for supply of the power Vcc to the sensor 3 shortened by employing the state transition shown in FIG. 8 as compared to that shown in FIG. 2. That is, "e" indicates the period of time from time point $t_{16}$ to time point $t_4$ in FIG. 9.

Only when the relation as described above is satisfied, total power consumption in the entire device can be reduced without fail by employing the state transition in FIG. 8 for the MCU 1 and sensor 3. Further a value for a normal result of detection can be obtained by estimation.

FIG. 10 is another block diagram showing an example of functional configuration of the MCU 1. The same reference numerals are assigned to the same components as those in FIG. 3. Description concerning the components already described above is omitted.

The estimation section 31 fetches a result of sampling for an output from the sensor 3 supplied from the sampling section 24 and stores the data in a buffer not shown. For instance, when a plurality of sampling results are acquired, the estimation section 31 estimates a value for a normal result of detection based on the acquired sampling results and on performance of the sensor 3. When a value for a normal result of detection can be estimated, the estimation section 31 outputs a signal indicating that estimation of a normal result of detection is possible to the power control section 21.

For instance, when a value for a normal result of detection is estimated based on a result of sampling executed twice, an estimated value y can be obtained through the following equation:

$$y=(y_2-y_1)/(t_2-t_1)*t_3+d$$

wherein $t_1$ and $t_2$ $(t_2>t_1)$ indicates the time points for first sampling and second sampling respectively; $y_1$ and $y_2$ $(y_2>y_1)$ indicates values obtained in the first sampling and in the second sampling respectively; y indicates a value (estimated value) for a normal result of detection; $t_3$ indicates the time required until a normal result of detection is outputted; and d indicates an offset.

Similarly, an algorithm for estimation is decided according to performance of the sensor 3 and is installed in the estimation section 31.

When the estimation section 31 can estimate a value for a normal result of detection based on a result of first sampling and the performance of the sensor 3, it is not necessary for the sampling section 24 to perform sampling several times. In this case, when sampling is carried out once, supply of the power Vcc to the sensor 3 is stopped, and an operational state of the MCU 1 is shifted to the sleep state.

Figure 11:
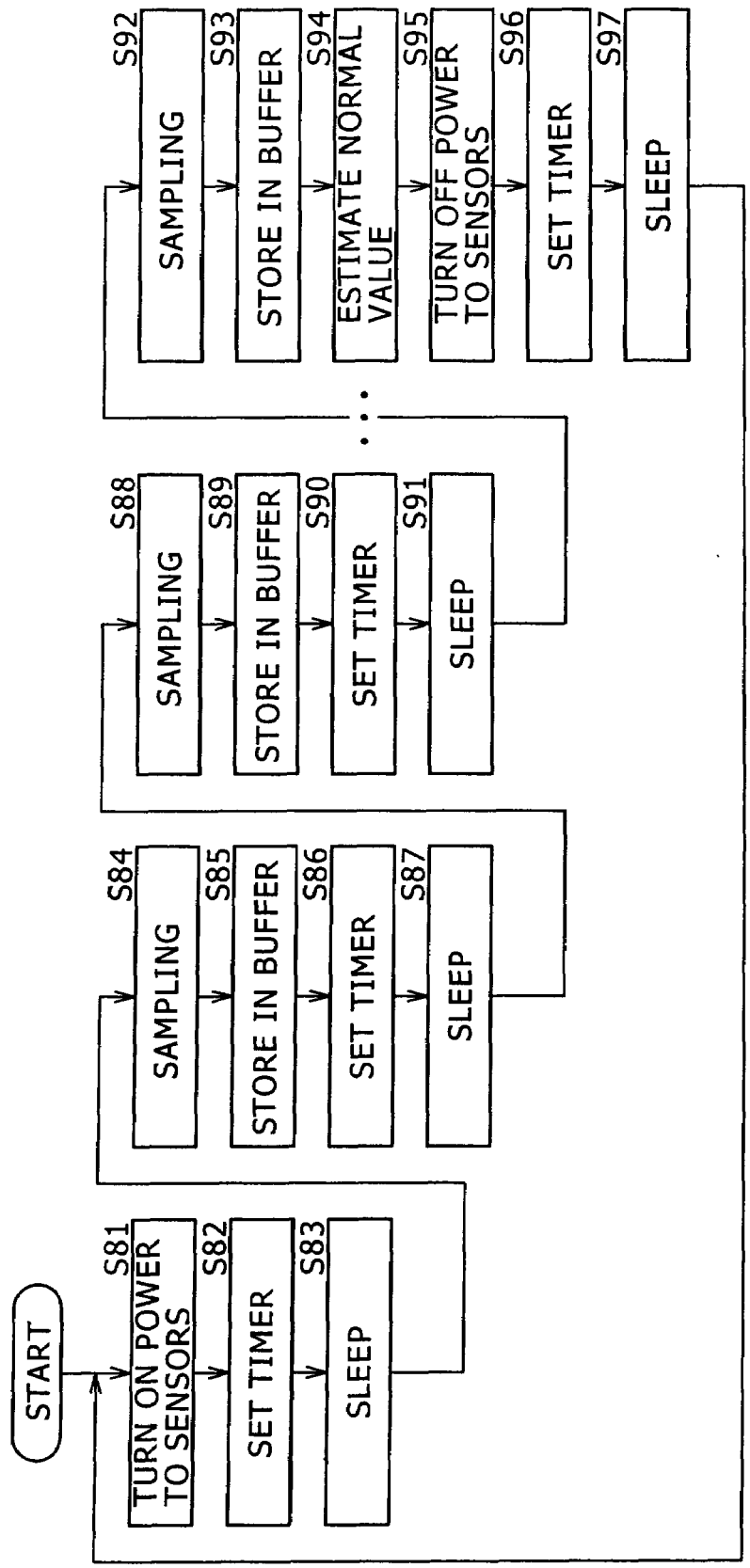
FIG. 11 is a flow chart showing the processing by the MCU for estimating a normal value for the sensor.

Next, the processing of the MCU 1 for controlling supply of the power Vcc to the sensor 3 following the state transition shown in FIG. 8 is described with reference to the flow chart in FIG. 11.

In step S81, the state management section 23 (in FIG. 10) in the MCU 1 controls the power control section 21 to start supply of the power Vcc to the sensor 3.

In step S82, the state management section 23 sets a time point for interruption, and in step S83, changes the operating state of the MCU 1 to the sleep state. With this operation, the operating state of MCU 1 changes, for instance, to the state of Sleep #1 via the state of Run #1 shown in FIG. 8.

When an interruption is generated and the MCU 1 returns the state effected just before the sleep state was effected, in step S84, the sampling section 24 executes sampling for an output from the sensor 3 under controls by the state management section 23. A result of sampling by the sampling section 24 is outputted to the estimation section 31.

In step S85, the estimation section 31 fetches a result of sampling supplied from the sampling section 24, and stores the data in a buffer not shown.

In step S86, the state management section 23 sets a time point for interruption, goes to step S87, and shifts the operating state of the MCU 1 to the sleep state. With this operation, the operating state of the MCU 1 is changed, for instance, to the state of Sleep #2 via the state of Run #2 shown in FIG. 8.

The process steps from step S88 to step S91 are the same as those from step S84 to step S87. In step S88, the sampling section 24 performs sampling for an output from the sensor 3 with the system control shifted to step S89, and then a result of the sampling is stored by the estimation section 31 in the buffer. Further in step S90, a timer is set. In step S91, the operating state of the MCU 1 is shifted to the sleep state.

The process steps from S88 to S91 are repeated until sampling results enabling estimation of a normal result of detection including a result of sampling in step S92 are obtained.

In step S92, the sampling section 24 executes sampling for an output from the sensor 3 under control by the state management section 23, and supplies a result of the sampling to the estimation section 31.

The estimation section 31 stores, in step S93, a result of sampling by the sampling section 24 in a buffer.

In step S94, the estimation section 31 estimates value for a normal result of detection from the sampling result stored in the buffer and the performance of the sensor 3, and, when the estimation can be made, outputs a signal indicating the possibility of estimation to the power control section 21.

The power control section 21 outputs, in step S95, a signal for turning OFF the FET 2 from the GPO terminal 11 to stop supply of the power Vcc to the sensor 3.

In step S96, the state management section 23 sets a timer, goes to step S97, and shifts the operating state of the MCU 1 to the sleep state. With this operation, the operating state of the MCU 1 is changed, for instance, via the state of Run #3 shown in FIG. 8, to the state of Sleep #3. Then an interruption is generated, and when the processing for executing the interruption handler as shown in FIG. 6 is finished, the process steps in step S81 and on as shown in FIG. 11 are repeated.

With the processing as described above, a period of time required for supply of the power Vcc to the sensor 3 can further be shortened.

Figure 12:
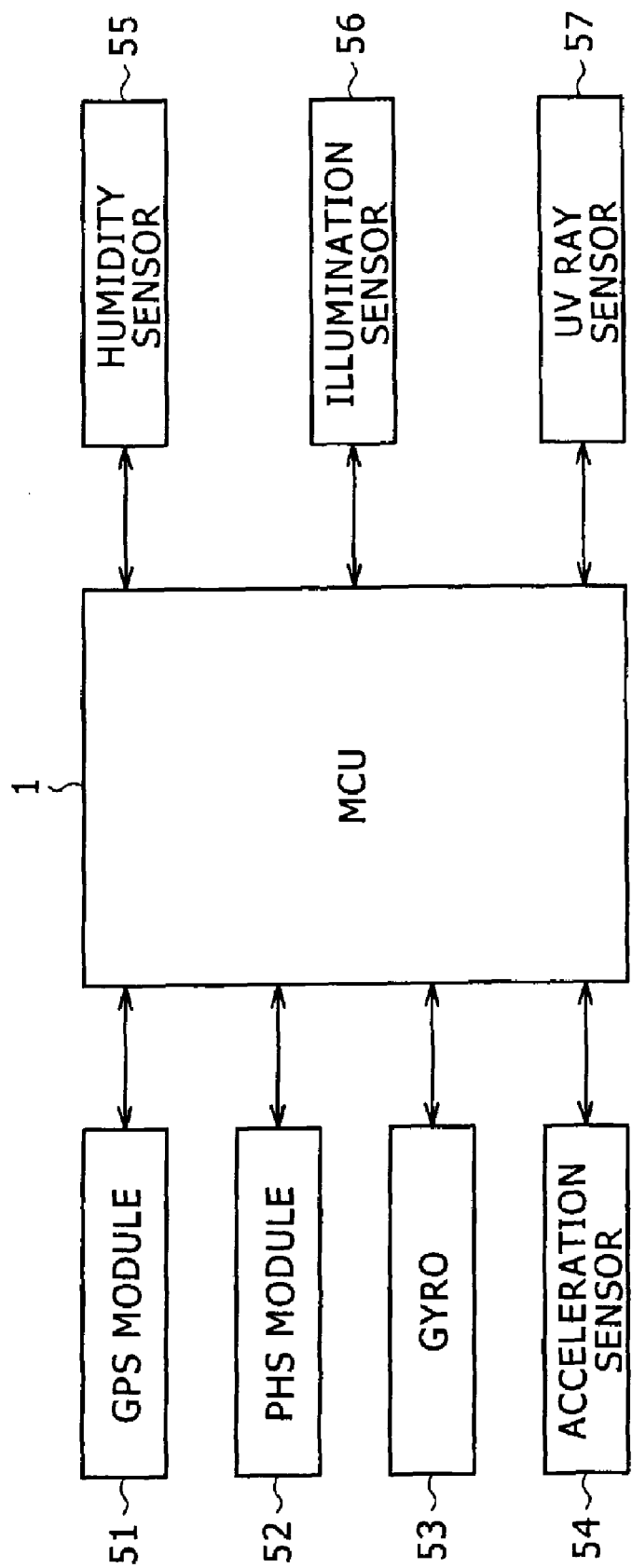
FIG. 12 is a block diagram showing another example of configuration of the information processing apparatus in which the present invention is applied.

FIG. 12 is a block diagram showing another example of configuration of the information processing apparatus in which the present invention is applied.

Connected to the MCU 1 shown in FIG. 12 are a GPS module 51 and a PHS module 52 each as a sensor for detecting a position of the information processing apparatus, a gyro (gyro compass) 53 for detecting a direction, an acceleration sensor 54 for detecting an acceleration, a humidity sensor 55 for detecting a humidity, an illumination sensor 56 for detecting an illumination, and a UV ray sensor 57 for detecting a dose of UV ray. When it is not necessary to discretely describe each of the GPS modules 51 through the UV ray sensor 57, a generic word of sensor is used.

An FET not shown for controlling supply of the power Vcc to each sensor is connected to each of the GPS modules 51 through the UV ray sensor 57. When the MCU 1 turns this FET ON or OFF, supply of the power Vcc to each sensor is controlled.

The MCU 1 shown in FIG. 12 is basically the same as that shown in FIG. 1. The MCU 1 shown in FIG. 12 turns ON or OFF the FET connected to each sensor, and fetches a result of detection from a signal outputted from each sensor and inputted into the GPI terminal.

In the information processing apparatus with the configuration as described above, the situation in which the information processing apparatus is placed is detected by the MCU 1 based on an output from at least one of the GPS modules 51 through the UV ray sensor 57, and supply of the power Vcc to other sensors not or little required to run in the detected situation (sensors each with low sensor) is stopped.

For instance, a sensor much consuming a power is regarded as a sensor with a lower priority, and supply of the power Vcc to the sensor is stopped.

With this feature, although the power Vcc is supplied for a relatively long period of time to sensors consuming a power a little for detecting the situation, the power is supplied to sensors much consuming a power only when the sensors are to be run, and as a result power consumption in the entire device can be reduced.

FIG. 13 is a view showing an example of state transition in a case where the situation is detected based on outputs from the gyro 53 and the acceleration sensor 54, and supply of the power Vcc to the GPS module 51 more consuming a power as compared to the gyro 53 and the acceleration sensor 54 is stopped.

In the example shown in FIG. 13, the power Vcc is supplied to the gyro 53 and the acceleration sensor 54 used for detecting the situation both in the run state and in the sleep state of the MCU 1. Therefore, when the gyro 53 and acceleration sensor 54 are ON, signals indicating directions and accelerations of the components are supplied to the MCU 1.

The MCU 1 supplies the power Vcc to the GPS module 51, based on the directions and accelerations sampled in the run state, only when it is determined that a user carrying the information processing apparatus is moving with a certain velocity.

The situation detected in this step indicates whether or not the information processing apparatus is moving with a certain velocity.

When the user carrying the information processing apparatus is not moving, also the position detected by the GPS module 51 does not change, so that operations of the sensors are not required. As described above, supply of the power Vcc to the GPS module 51 is controlled. Power consumption by the GPS module 51 can be reduced more as compared to the case where the power Vcc is supplied to the GPS module 51 even when the necessity of running the module is rather low.

In the state of Run #1 started at the time point t21, the MCU 1 performs sampling for outputs from the gyro 53 and the acceleration sensor 54, and computes a moving speed of the user carrying the information processing apparatus. Further based on a result of the operation, when it is determined that the user's moving speed is less than the threshold value, the MPU 1 stops supply of the power Vcc to the GPS module 51.

In response to this operation, the GPS module 51 having been active is deactivated, for instance, at the time point $t_{22}$.

The MCU 1 stops supply of the power Vcc to the GPS module 51, sets a timer, and shifts the operating state of its own to the state of Sleep #1 at the time point $t_{23}$.

The MCU 1 restored from the sleep state upon an interruption generated at the time point $t_{24}$ computes a moving speed of the user carrying the information processing apparatus, in the state of Run #2, based on the sampling results for outputs from the gyro 53 and acceleration sensor 54 like in the state of Run #1.

For instance, when it is determined based on a result of computing that the user is moving at a speed higher than the threshold value, the MCU 1 starts supply of the power Vcc to the GPS module 51.

In response to this operation, the GPS module 51 having been in the power OFF state resumes the operation, for instance, at the time point $t_{25}$.

The MCU 1 starts supply of the power Vcc to the GPS module 51 and performs measurement of a position or the like based on a signal outputted from the GPS module 51, sets a timer according to the necessity, and shifts the operating state of its own to the sleep state.

A power consumption rate in the gyro 53 and in the acceleration sensor 54 is about 1.2 mW respectively (totally about 2.4 mW), while that in the GPS module 51 is about 413 mW. Therefore, when the state transition as shown in FIG. 13 is realized, an operating time of sensors each consuming a power 150 times or more is to be short. Thus, power consumption in the entire device can be reduced.

Figure 14:
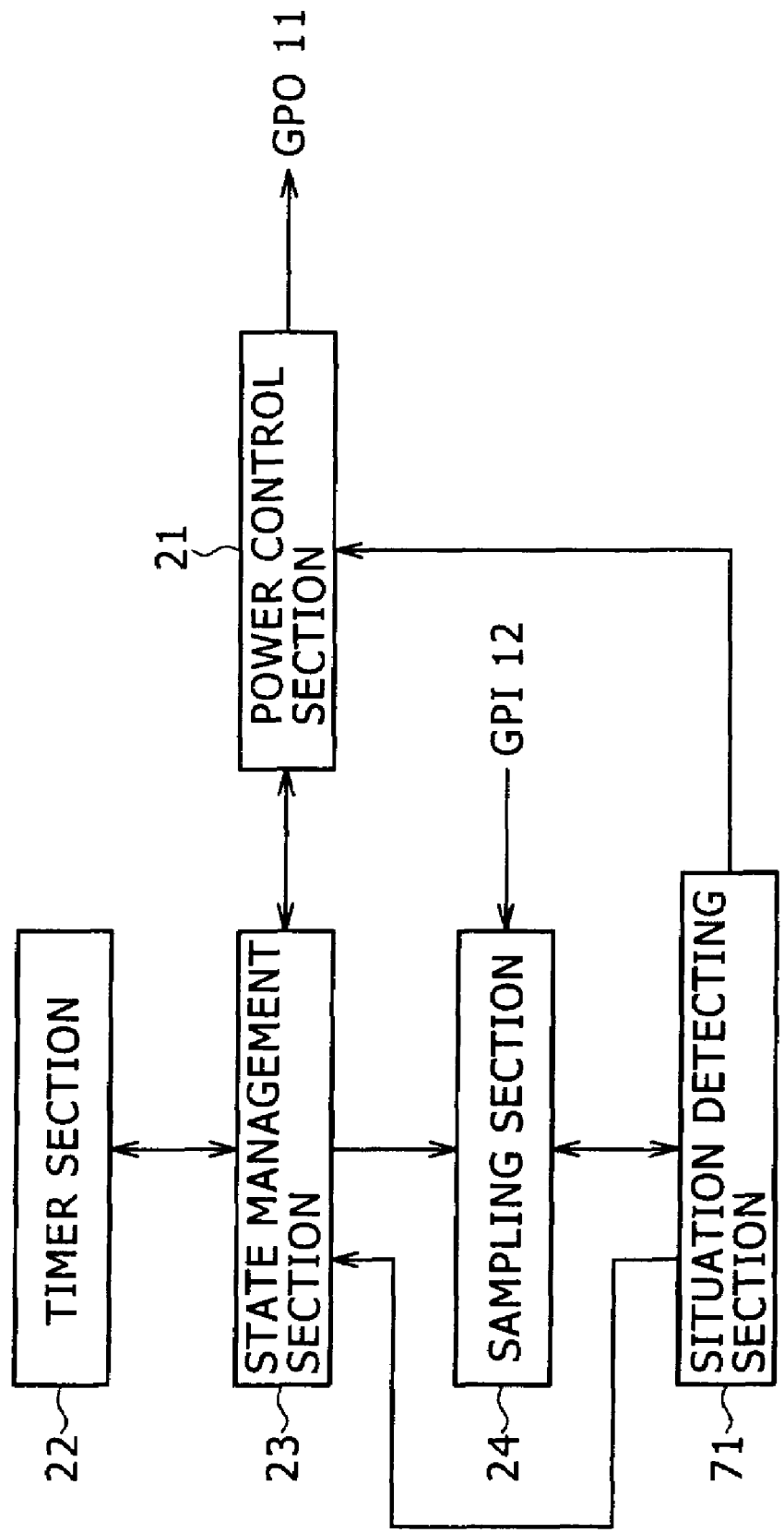
FIG. 14 is a block diagram showing an example of functional configuration of the MCU shown in FIG. 12.

FIG. 14 is a block diagram showing an example of functional configuration of the MCU 1 shown in FIG. 12. The same reference numerals are assigned to the same components as those shown in FIG. 3 and FIG. 10. Descriptions of the duplicated components are omitted herefrom.

The power control section 21 turns ON or OFF an FET connected to each of the GSP module 51 through the UV ray sensor 57, and controls supply of the power Vcc to the sensor.

The sampling section 24 executes sampling for outputs from active ones among the GSP module 51 through the UV ray sensor 57, and outputs a result of sampling to a situation detecting section 71 according to the necessity.

The situation detecting section 71 detects a situation under which the information processing apparatus is placed (such as a moving speed thereof) based on sampling results outputted from, for instance, the gyro 53 and acceleration sensor 54 and supplied from the sampling section 24. The situation detecting section 71 makes the power control section 21 control supply of the power Vcc to each sensor according to the detected situation.

Figure 15:
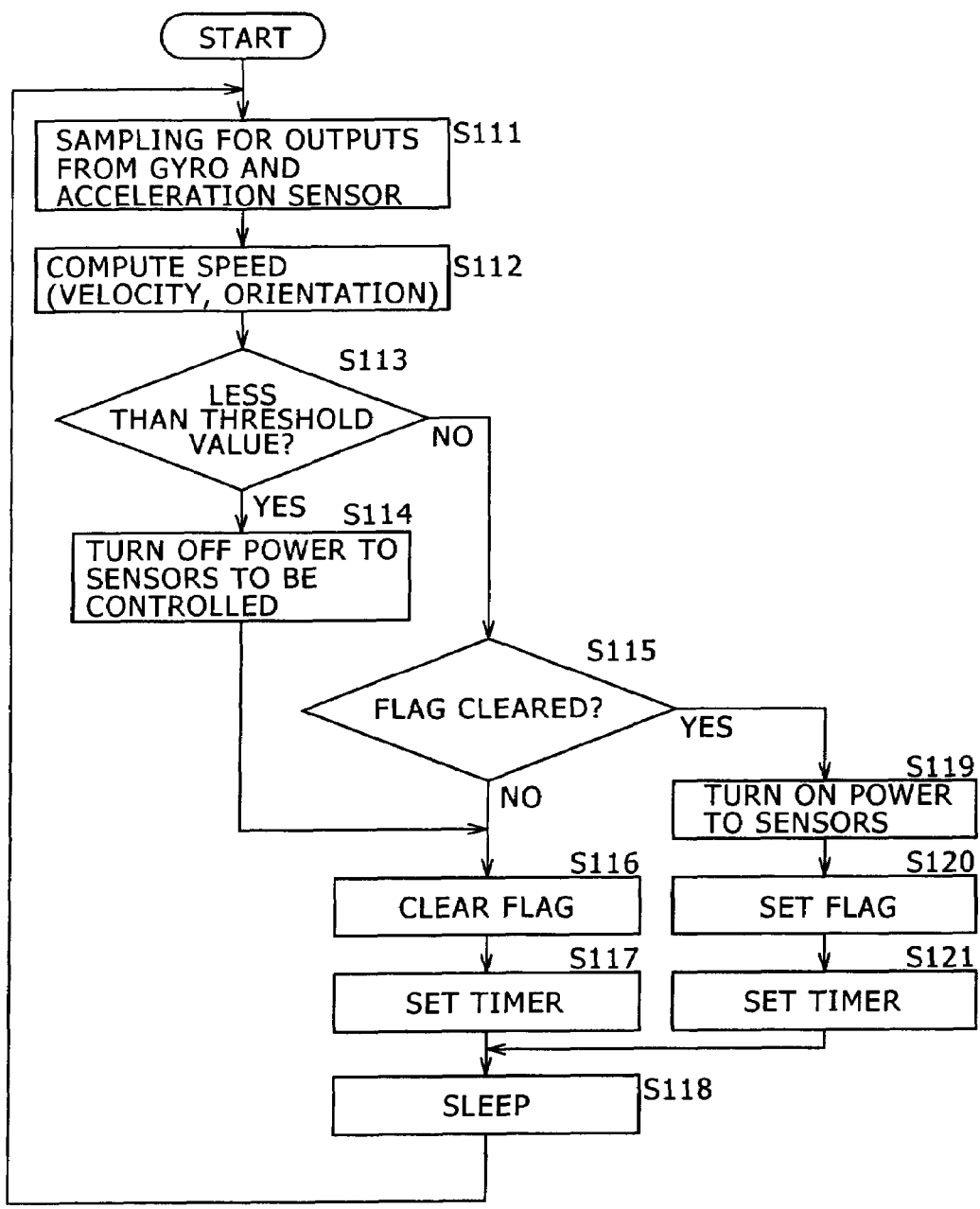
FIG. 15 is a flow chart for illustrating the processing by the MCU for sensing the operating situation and controlling supply of a power Vcc to a sensor.

The processing performed by the MCU 1 to detect a situation based on outputs from the gyro 53 and acceleration sensor 54 and control supply of the power Vcc to the GPS module 51, the priority of which is lower in the detected situation, is described below with reference to the flow chart in FIG. 15.

In step S111, the sampling section 24 of the MCU 1 (Refer to FIG. 14) carries out sampling for outputs from the gyro 53 and acceleration sensor 54, and outputs the sampling result to the situation detecting section 71.

In step S112, the situation detecting section 71 computes a moving speed (velocity and direction) of the information processing apparatus based on a result of sampling supplied from the sampling section 24, then goes to step S113, and determines whether or not the information processing apparatus little moves, namely whether or not the computed moving speed is less than a predetermined threshold value.

When it is determined in step S113 that the information processing apparatus moves little, the situation detecting section 71 outputs a signal indicating the situation to the power control section 21, and goes to step S114.

In step S114, the power control section 21 stops supply of the power Vcc to the GPS module 51 as a sensor to be controlled. Then the process steps in step S116 and on are executed. With the operations described above, the GPS module 51 regarded as a sensor with lower priority in the situation where the information processing apparatus little moves is stopped.

On the other hand, when it is determined in step S113 that the information processing apparatus is moving with a speed higher than the threshold value, the situation detecting section 71 outputs a signal indicating the situation to the state management section 23, and goes to step S115.

The state management section 23 determines in step S115 whether or not the flag is clear, and when it is determined that the flag is not clear (the power for the GPS module 51 is ON and the flag is set), the state management section 23 goes to step S116.

In step S116, the state management section 23 clears the flag, goes to step S117, and sets a timer.

After the timer is set, the state management section 23 goes to step S118, and shifts the operating state of the MCU 1 to the sleep state. After an interruption is generated and the processing for executing the interruption handler as shown in FIG. 6 is carried out, the process steps in step S111 and on are repeated.

When the state management section 23 determines in step S115 that the flag is clear (the power for the GPS module 51 is OFF), the state management section 23 goes to step S119, and controls the power control section 21 to start supply of the power Vcc to the GPS module 51.

When the information processing apparatus is moving at a speed higher than the threshold value and also the power Vcc is not supplied to the GPS module 51, supply of the power Vcc is started. In the situation when the information processing apparatus is moving at a certain speed, the GPS module 51 is regarded as a sensor with high priority.

In step S120, the state management section 23 sets the flag, goes to step S121, and sets a timer. After the timer is set, the state management section 23 goes to step S118, and the state management section 23 changes the operating state of its own to the sleep state.

With the processing as described above, only when the information processing apparatus is moving at a speed not less than the threshold value, the power Vcc is supplied to the GPS module 51.

Assuming, for instance, that the precision in measurement of a position by the GPS module 51 is 20 m. When a travel of the information processing apparatus within a cycle of positioning (a value obtained by multiplying a velocity computed based on outputs from the gyro 53 and acceleration sensor 54 by a cycle in positioning by the GPS module 51) is not more than 20 m, the power Vcc is not supplied to the GPS module 51. When the value is over 20 m, supply of the power Vcc to the GPS module 51 is started.

That is, not only the sensors to be activated, but also the sampling cycle changes according to the situation under which the information processing apparatus is placed currently. For instance, when a user carrying the information processing apparatus is moving by car, the sampling for an output from the GPS module 51 (positioning) is performed with a shorter cycle as compared to that when the user is moving on foot.

As described above, a cycle of sampling for an output from a sensor is changed according to the current situation. Power consumption by the MCU 1 can be reduced.

In the case described above, the current situation is detected based on outputs from the gyro 53 and acceleration sensor 54, and supply of the power Vcc to the GPS module 51 is controlled according to the detected situation, but also the configuration is allowable in which the current situation is detected based on outputs from other sensors and supply of the power Vcc to sensors other than the other sensors is controlled according to the detected situation.

For instance, the configuration is allowable in which whether or not an information processing apparatus is inside a house is determined according to outputs from the illumination sensor 56 and the UV ray sensor 57. The power Vcc is supplied to the GPS module 51 only when it is determined that the information processing apparatus is outside the house.

When the information processing apparatus is inside a house, sometimes the GPS module 51 cannot accurately position the information processing apparatus. Thus, power consumption in the information processing apparatus as a whole can be reduced by stopping supply of the power Vcc to the GPS module 51. In this case, the illumination sensor 56 and the UV ray sensor 57 still run, but the power consumption is substantially lower than that by the GPS module 51.

Figure 16:
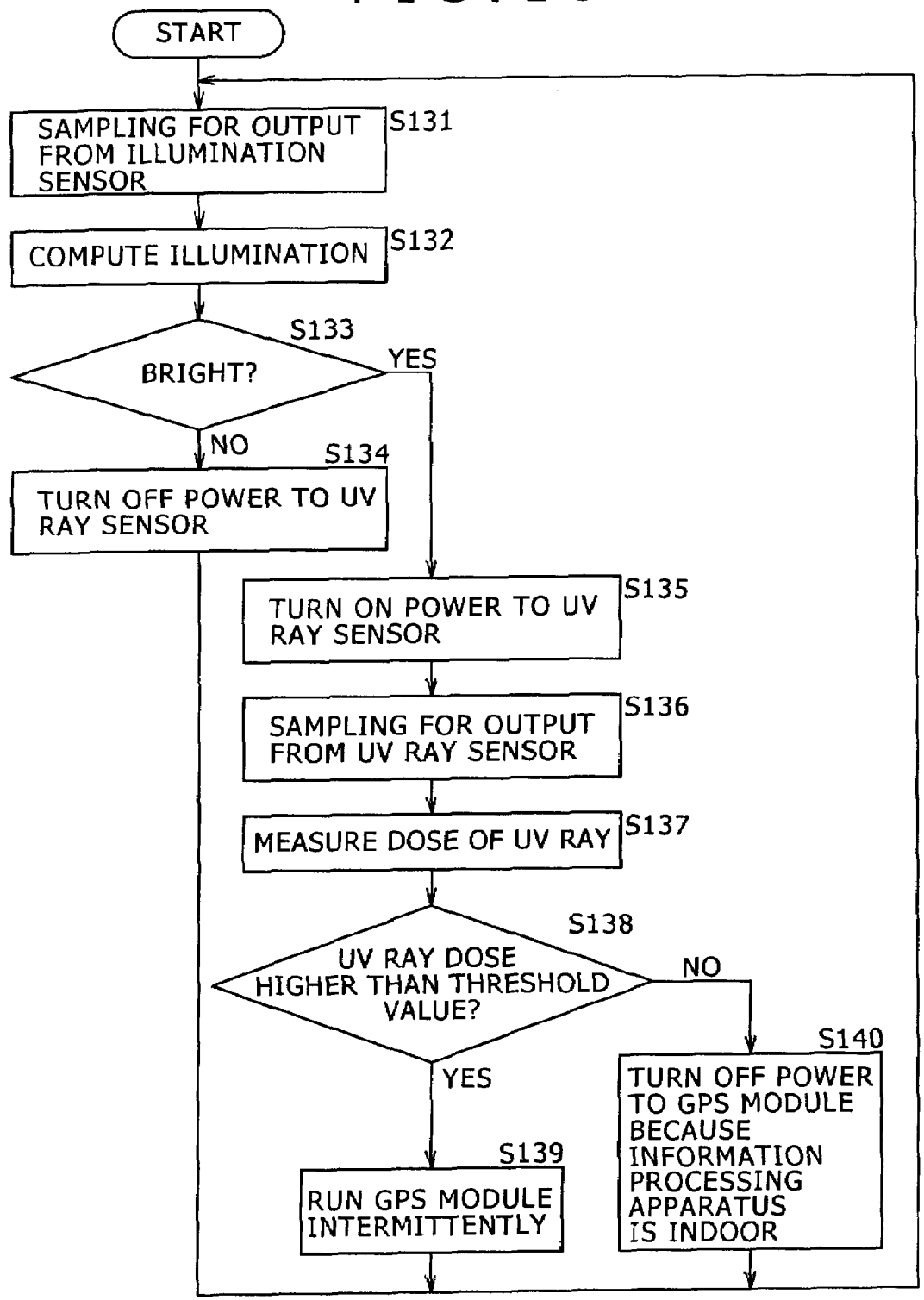
FIG. 16 is a flow chart showing another processing by the MCU for sensing the operating situation and controlling supply of a power Vcc to a sensor.

Next, description is made with reference to the flow chart shown in FIG. 16 for a case in which the current situation is detected based on outputs from the illumination sensor 56 and UV ray sensor 57 and supply of the power Vcc to the GPS module 51 is controlled by the MCU 1 based on outputs from the illumination sensor 56 and the UV ray sensor 57.

In step S131, the sampling section 24 of the MCU 1 carries out sampling for an output from the illumination sensor 56, and outputs the sampling result to the situation detecting section 71.

In step S132, the situation detecting section 71 computes the illumination based on the sampling result supplied from the sampling section 24, goes to step S133, and determines whether or not it is bright or dark, namely whether the computed illumination is higher than the predetermined threshold value.

In step S133, when the situation detecting section 71 determines that the information processing apparatus is in a place having illumination not higher than the predetermined threshold value, the situation detecting section 71 outputs a signal indicating the situation to the power control section 21, and goes to step S134.

In step S134, when the power Vcc is supplied to the UV ray sensor 57, the power control section 21 stops the supply.

When relatively low illumination is detected, it is highly likely that the information processing apparatus is inside a house, so that, in many cases, the detection of a dose of UV ray is not absolutely necessary. Thus, under the circumstances as described above, priority of the UV ray sensor 57 becomes low, and power consumption can be reduced by stopping an operation of the UV ray sensor 57.

The process step then returns to the step S131, and the process steps in step S131 and on are repeated.

On the other hand, in step S133, when the situation detecting section 71 determines that the information processing apparatus is in a place having illumination not lower than the predetermined threshold value, the situation detecting section 71 outputs a signal indicating the situation to the power control section 21, and goes to step S135.

In step S135, the power control section 21 starts, when the power Vcc is not supplied to the UV ray sensor 57, the supply. From the UV ray sensor 57 is supplied a signal indicating a detected dose of UV ray.

In step S136, the sampling section 24 executes sampling of an output from the UV ray sensor 57, and outputs a sampling result to the situation detecting section 71.

In step S137, the situation detecting section 71 computes a dose of UV ray based on the sampling result supplied from the sampling section 24, goes to step S138, and determines whether or not the dose of UV ray is higher than the predetermined threshold value.

In step S138, when the situation detecting section 71 determines that a dose of UV ray is higher than the predetermined threshold value, the situation detecting section 71 recognizes that it is highly likely that the information processing apparatus is carried to the outdoors, and outputs a signal indicating the situation to the power control section 21.

In step S139, the power control section 21 starts, in response to a signal supplied from the situation detecting section 71, an intermittent operation of the GPS module 51, and executes positioning. When it is highly likely that the information processing apparatus is carried to the outdoors, the GPS module 51 becomes a sensor having a high priority, and operations thereof are started.

As described hereinafter, positioning by the GPS module 51 in this step can be designed to be executed while the power consumption thereof is reduced. Intermittent operations by the GPS module 51 are described hereinafter with reference to FIG. 17.

The process step returns to the step S131 after the intermittent operations by the GPS module 51 are started, and the process steps in step S131 and on are repeated.

On the other hand, in step S138, when the situation detecting section 71 determines that a dose of UV ray is lower than the predetermined threshold value, the situation detecting section 71 recognizes that it is highly likely that the information processing apparatus is inside a house, and outputs a signal indicating the situation to the power control section 21.

In step S140, when the power Vcc is supplied to the GPS module 51, the power control section 21 stops the supply, and repeats the process steps in step S131 and on.

In a case where it is detected that the information processing apparatus is inside a house, a PHS module 52, which is also used as a positioning device but is mutually exclusive with the GPS module 51, may be operated to execute positioning. The PHS module 52 is a sensor capable of positioning even when the information processing apparatus is inside a house. Positioning can be performed under any circumstances with the configuration in which the GPS module 51 executes positioning when the information processing apparatus is outside a house, while the PHS module 52 executes positioning when the information processing apparatus is inside a house.

FIG. 17 is a view showing an example of intermittent operations of the GPS module 51 executed in step S139 shown in FIG. 16.

The MCU 1 makes at the time point $time_{31}$ a cold start with which a current positioning is started without employing a result of the previous positioning, and shifts to the sleep state at the time point $time_{32}$ just when the MCU 1 detects that outputs from the GPS module 51 contain a positioning bit. This positioning bit is outputted when the GPS module 51 captures a satellite.

In FIG. 17, when the period of time during which a satellite is not captured continues for about 15 minutes, the situation is assumed as a time out (termination of search for a satellite).

Further, before shifted to the sleep state, the MCU 1 not only sets a timer, but also stops supply of the power Vcc to the GPS module 51 and stores information on a satellite captured by the GPS module 51. The GPS module 51 enters the state of Power Off in response to controls by the MCU 1.

In a case where a satellite has been captured once, and information thereof is stored, the MCU 1 can make, at the start of the next positioning, a warm start or a hot start with which positioning is started based on the stored information on the satellite or the like. Therefore the MCU 1 makes the GPS module 51 execute an intermittent operation in a cycle in which the capture is started before a certain period of time ready for making a warm start or a hot start passes.

In the example in FIG. 17, it is assumed that the GPS module 51 executes an intermittent operation in a five-minute cycle. The five minutes represents a period of time during which a warm start or a hot start can be made.

In a case of a warm start or a hot start, positioning can be performed at an earlier timing as compared to that of a cold start, and the MCU 1 returns by an interruption generated at the time point $t_{33}$, which is 5 minutes after the MCU 1 enters the sleep state, and makes instructions to supply the power Vcc to the GPS module 51. Further, the MCU 1 executes positioning based on an output from the GPS module 51 between, for instance, 1 second and 2 seconds.

After completing the positioning, the MCU 1 sets a timer, stops supply of the power Vcc to the GPS module 51, and then enters the sleep state only for a period of time during which a warm start or a hot start can be made. The GPS module 51 also enters the state of Power Off in response to the controls by the MCU 1.

Operations as described above are repeated and the MCU 1 and GPS module 51 execute intermittent operations from the time point $t_{35}$ to $t_{36}$ and the time point $t_{37}$ to $t_{38}$. At the time point $t_{39}$, operations similar to those at the time point $t_{33}$ and on are repeated.

With the state transition as described above, time required for operations of the MCU 1 and GPS module 51 can be shortened, and MCU 1 returns from the sleep state before a period of time ready for making a warm start or a hot start passes, so that a quick positioning after the return is also possible.

Next, other processing of the MCU 1 for detecting the situation in which the information processing apparatus is put, and for controlling supply of the power Vcc to other sensors based on a result of detection is described with reference to the flow chart in FIG. 18.

Figure 18:
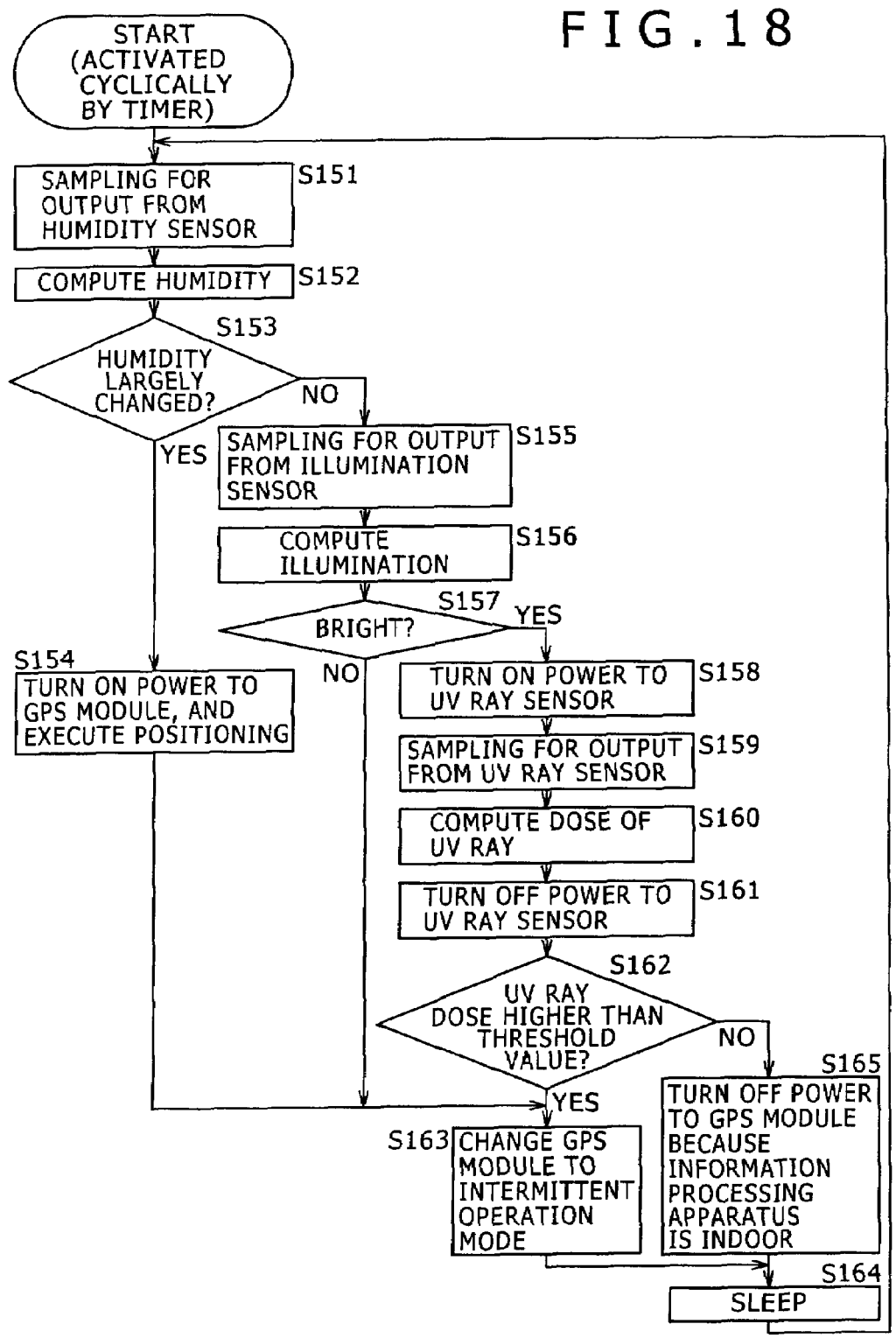
FIG. 18 is a flow chart for illustrating still another processing by the MCU for sensing the operating situation and controlling supply of a power Vcc to a sensor.

In the processing shown in FIG. 18, as is the case with that shown in FIG. 16, the situation is detected based on not only an output from an illumination sensor 56 and a UV ray sensor 57 but also an output from a humidity sensor 55.

When humidity changes significantly, it is highly likely that a user carrying an information processing apparatus moves from inside a room to the outside, from outside a room to the inside, from inside a room to inside another room, or the like.

Thus, when a significant change in humidity as described above is detected, whether or not positioning by the GPS module 51 is possible is confirmed once, so that a problem such that the positioning is not performed even though it is possible can be prevented.

In step S151, the sampling section 24 in FIG. 14 is activated by a timer in a certain cycle, executes sampling for an output from the humidity sensor 55, and outputs the sampling result to the situation detecting section 71.

In step S152, the situation detecting section 71 computes the humidity based on the sampling result supplied from the sampling section 24, goes to step S153, and determines whether or not the humidity changes more significantly than a predetermined threshold value width, for instance, as compared to that sampled last time.

In step S153, when the situation detecting section 71 determines that the humidity changes significantly, the situation detecting section 71 outputs a signal indicating the situation to the power control section 21, and goes to step S154.

In step S154, when the power Vcc is not supplied to the GPS module 51, the power control section 21 starts the supply. When a significant change in humidity is detected, the GPS module 51 becomes a sensor having a high priority.

The sampling section 24 executes sampling based on an output from the GPS module 51. Then the process step goes to step S163 described hereinafter.

On the other hand, in step S153, when the situation detecting section 71 determines that the humidity does not change significantly, the situation detecting section 71 outputs a signal indicating the situation to the power control section 21, and goes to step S155.

In step S155, the sampling section 24 carries out sampling for an output from the illumination sensor 56, and outputs the sampling result to the situation detecting section 71.

In step S156, the situation detecting section 71 computes the illumination based on the sampling result supplied from the sampling section 24, goes to step S157, and determines whether it is bright or dark, namely whether or not the computed illumination is higher than the predetermined threshold value. In step S157, when it is not determined that the computed illumination is higher than the predetermined threshold value, the process step goes to step S163.

In step S157, when the situation detecting section 71 determines that the information processing apparatus is in a place having illumination higher than the predetermined threshold value, the situation detecting section 71 outputs a signal indicating the situation to the power control section 21, and goes to step S158.

In step S158, the power control section 21 starts, when the power Vcc is not supplied to the UV ray sensor 57, the supply. From the UV ray sensor 57 is thereby supplied a signal indicating a detected dose of UV ray to the MCU 1.

In step S159, the sampling section 24 executes sampling for an output from the UV ray sensor 57, and outputs the sampling result to the situation detecting section 71.

In step S160, the situation detecting section 71 computes a dose of UV ray based on the sampling result supplied from the sampling section 24, goes to step S161 when the calculation is finished, and makes the power control section 21 stop the supply of the power Vcc to the UV ray sensor 57.

In step S162, the situation detecting section 71 determines whether or not a dose of UV ray is higher than the predetermined threshold value. When the situation detecting section 71 determines that the dose of UV ray is higher than the predetermined threshold value, the situation detecting section 71 recognizes that it is highly likely that the information processing apparatus is in the outdoor, and outputs a signal indicating the situation to the power control section 21.

In addition to a case where it is determined in step S162 that a dose of UV ray is higher than the predetermined threshold value, in a case where positioning is executed in step S154 and in a case where it is not determined in step S159 that the information processing apparatus is in a place having illumination higher than the predetermined threshold value, the power control section 21 starts in step S1163 an intermittent operation (for instance, an operation in FIG. 17) of the GPS module 51.

Then the state management section 23 sets a timer or the like, enters the sleep state in step S1164, and repeats the process steps in step S151 and on.

On the other hand, in step S162, when it is determined that a dose of UV ray is lower than the predetermined threshold value, the situation detecting section 71 recognizes that it is highly likely that the information processing apparatus is inside a house, and outputs a signal indicating the situation to the power control section 21.

In step S165, when the power Vcc is supplied to the GPS module 51, the power control section 21 stops the supply, goes to step S164 and enters the sleep state.

After the process steps described above, when a relatively significant change in humidity is detected, positioning by the GPS module 51 is carried out once, and after the positioning, another positioning by an intermittent operation as described with reference to FIG. 17 is performed. With this configuration, positioning by the GPS module 51 is ensured even in a case where the situation changes (in a case where the information processing apparatus is moved), while power consumption is reduced.

In an intermittent operation as shown in FIG. 17, once the power control section 21 enters the sleep state, the next positioning is not carried out, for instance, in 5 minutes. However, when it is detected that the information processing apparatus is moved, positioning is executed once, so that a problem such that the positioning is not performed even though a user carrying the information processing apparatus moves can be prevented.

Movement of a user carrying the information processing apparatus can be detected based on an output from the gyro 53 or the acceleration sensor 54 as described above, however, the humidity sensor 55 generally consumes less power than the gyro 53 or the acceleration sensor 54 (A power consumption rate in the gyro 53 and in the acceleration sensor 54 is both about 1.2 mW, while that in the humidity sensor 55 is about 0.7 mW).

Thus the configuration is allowable in which, even when the same physical quantity is to be detected, the MCU 1 sets a priority of sensors, and selects one to be operated, so that the sensor consuming power as little as possible is used.

In the configuration described above, the MCU 1 is intermittently moved along with, for instance, a sensor, however, when the MCU 1 is a high performance unit in which a program is developed in an external RAM and the program can be executed at a higher speed as compared to a one-tip unit having a built-in RAM or the like, switching between the run state and the sleep state can not be performed at a high speed, because a clock speed of the MCU 1 and that of the RAM are different, and it takes time for the both clocks to stabilize.

Further, the MCU 1 having high performance as described above requires more power consumption than a one-tip unit having a built-in RAM or the like, so that it is not preferable from the viewpoint of power saving that the high-performance MCU 1 is intermittently operated along with a sensor to be activated from the sleep state only for executing sampling.

Thus the configuration is allowable in which, for instance, a one-tip unit for executing sampling of an output from a sensor is provided in the information processing apparatus, in addition to a high-performance MCU.

Figure 19:
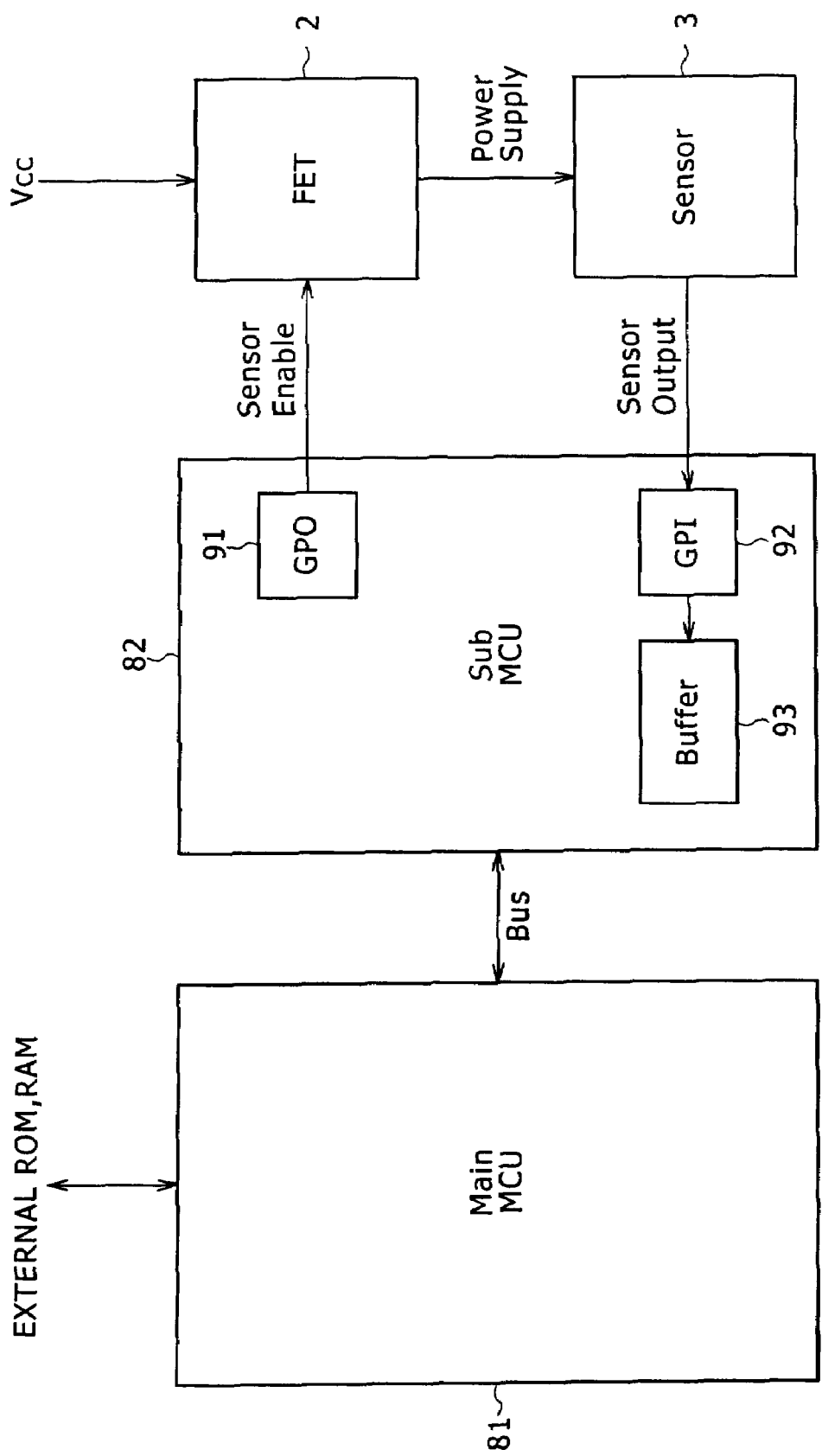
FIG. 19 is a block diagram showing still another example of configuration of the information processing apparatus in which the present invention is applied.

FIG. 19 is a block diagram showing still another example of configuration of the information processing apparatus in which the present invention is applied.

In the information processing apparatus in FIG. 19 provided are a Main MCU 81 and a Sub MCU 82.

The Main MCU 81 develops a program stored in an external ROM to an external RAM, and executes the same. Further, the Main MCU 81 fetches a sampling result for an output from the sensor 3 at a predetermined timing from the Sub MCU 82, and executes predetermined processing employing the sampling result.

The Sub MCU 82 is, for instance, a one-tip unit having a built-in RAM or the like. The Sub MCU 82 can perform switching between the run state and the sleep state at a higher speed as compared to the Main MCU 81 with less power consumption. The Sub MCU 82 basically has the same functions as those of the MCU 1 in FIG. 1.

Namely, the Sub MCU 82 carries out an intermittent operation along with the sensor 3, controls supply of the power Vcc to the sensor 3 by switching ON/OFF of the FET 2 in response to a signal outputted from a GPO terminal 91, and executes sampling of a signal supplied from the sensor 3 to a GPI terminal 12.

A sampling result by the Sub MCU 82 is stored in a buffer 93, and when a predetermined amount of sampling results is stored therein through repeated sampling, the stored sampling results are supplied via a bus from the Sub MCU 82 to the Main MCU 81 in the mass.

Thus the Main MCU 81 does not need to restore from the sleep state every time the Main MCU 81 carries out sampling of an output from the sensor, and only needs to restore just when the Main MCU 81 fetches a certain amount of the massed sampling results. The Main MCU 81 consumes more power than the Sub MCU 82, so that power consumption of the entire information processing apparatus can be reduced by shortening an operating time of such a unit consuming much power.

It is to be noted that the configuration is allowable in which a sensor connected to the Sub MCU 82 is not limited to the sensor 3, but a plurality of sensors can be connected thereto as shown in FIG. 12. When a plurality of sensors are connected to the Sub MCU 82, the Sub MCU 82 executes processing as described above, namely, detecting the situation of the information processing apparatus based on an output from a sensor, and controlling operations of other sensors based on the detected result.

The processing performed by the Sub MCU 82 is described with reference to the flow charts in FIG. 20 through FIG. 22. In this example, it is assumed that a plurality of sensors as shown in FIG. 12 are connected to the Sub MCU 82. Further it is assumed that the Sub MCU 82 has the configuration as shown in FIG. 14.

In step S201, the situation detecting section 71 in the Sub MCU 82 (See FIG. 14) monitors a result of sampling sent from the sampling section 24 and outputted from the humidity sensor 55.

In step S202, the situation detecting section 71 determines whether the humidity has changed more than the threshold value for the change width or not, and when it is determined that the humidity has changed more than the threshold value for the change width, the situation detecting section 71 goes to step S203, and reports via a bus to the Main MCU 81 that movement in a space has been detected. The Main MCU 81 is kept active at the minimum level so that a report from the Sub MCU 82 can always be received.

When the humidity has changed largely, the possibility is high, for instance, that a space in which the information processing apparatus is placed has changed, namely that the information processing apparatus has been moved, for instance, from a room to another room. Therefore, when it is necessary to execute specific processing according to a result of detection concerning the movement, the Main MCU 81 is restored from the sleep state and executed the processing.

When it is determined that the humidity has largely changed, the situation detecting section 71 outputs a signal indicating the change to the power control section 21, for instance to start supply of the power Vcc to the illumination sensor 56 when the power Vcc is not supplied.

In step S204, the situation detecting section 71 monitors a result of sampling for an output from the illumination sensor 56 sent from the sampling section 24, and then goes to step S205, and determines that the illumination is not less than a predetermined threshold value a or not.

When it is determined in step S205 that the illumination is not less than the threshold value a, the situation detecting section 71 outputs a signal indicating the fact to the power control section 21, and when the power Vcc is not supplied, starts supply of the power Vcc to the UV ray sensor 57.

In step S206, the situation detecting section 71 monitors a result of sampling for an output from the UV ray sensor 57 sent from the sampling section 24, goes to step S207, and determines whether a dose of UV rays is not less than a predetermined threshold value or not.

When it is determined in step S207 that a dose of UV ray is not less than the threshold value, the situation detecting section 71 goes to step S208, and reports to the Main MCU 81 that the information processing apparatus may have been removed to outdoors.

When a predetermined processing is required according to the fact that the information processing apparatus is currently outside a house, the Main MCU 81 is restored from the sleep state and executes the required processing.

In step S209, the situation detecting section 71 selects the GPS module 51 as a device for positioning the information processing apparatus and output a signal indicating the selection to the power control section 21, for instance, to start supply of the power Vcc to the GPS module 51 if the power Vcc is not supplied thereto.

In step 210, the sampling section 24 carried out sampling for an output from the GPS module 51 (for positioning), goes to step S211, and stores the data indicated a result of positioning in a buffer 93 (Refer to FIG. 19). When the information processing apparatus is outdoor, the processing in FIG. 20 is repeated and the data indicating record of positioning results in the buffer 93.

In step S212, the sampling section 24 determines whether a certain volume of data (sampling result) has been stocked in the buffer 93 or not, and when it is determined that a required volume of data has not been stocked therein, the processing is terminated. Then the processing in FIG. 20 is repeated with a predetermined cycle.

Figure 24:
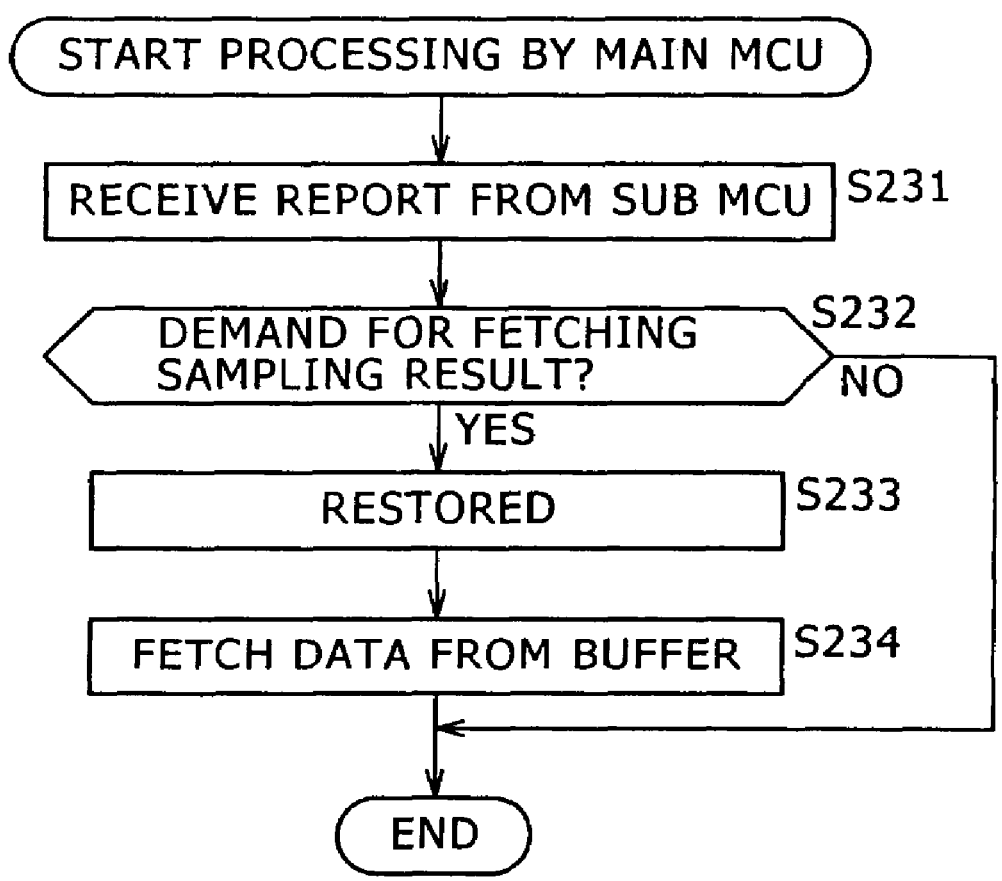
FIG. 24 is a flow chart for illustrating the processing by a Main MCU shown in FIG. 19.

When it is determined in step S212 that a required volume of data has been stocked, the sampling section 24 goes to step S213, and demands the Main MCU 81 to fetch the data stocked in the buffer 93 and terminates the processing. In response to this demand, the Main MCU 81 is restored from the sleep state and fetches the data stocked in the buffer 93 via a bus (step S234 in FIG. 24).

Figure 21:
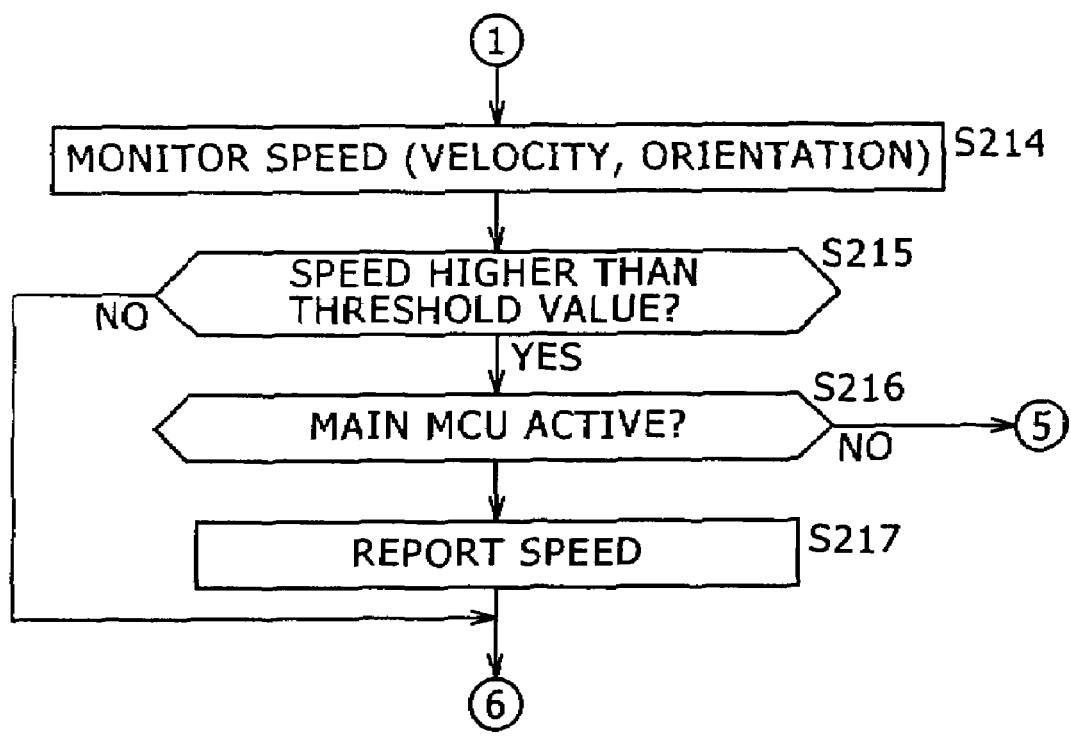
FIG. 21 is a flow chart in succession to FIG. 20 for illustrating the processing by the Sub MCU shown in FIG. 19.

On the other hand, when it is determined in step S202 that the change rate of humidity is not larger than the threshold value, the situation detecting section 71 goes to step S214 (Refer to FIG. 21). When the power Vcc is not supplied, the situation detecting section 71 controls the power control section 21, and starts supply of the power Vcc to the gyro 53 as well as to the acceleration sensor 54.

In step S214, the situation detecting section 71 monitors a speed compute from a result of sampling for outputs from the gyro 53 and acceleration sensor 54 sent from the sampling section 24, goes to step 215, and determines whether the speed is not less than the threshold value or not.

When it is determined that the speed is less than the predetermined threshold value, the situation detecting section 71 skips the processing steps S216 and S217, and terminates the processing.

When it is determined in step S215 that the speed is not less than the predetermined threshold value, the situation detecting section 71 goes to step S216, and determines whether the Main MCU 81 is active or not (in the sleep state or not).

When it is determined in step S216 that the Main MCU 81 is active, the situation detecting section 71 goes to step S217, and reports the speed obtained from the outputs from the gyro 53 and acceleration sensor 54 to the Main MCU 81. Then the processing is terminated.

When it is determined in step S216 that the Main MCU 81 is not active, the situation detecting section 71 goes to step S211, and stored the data indicating the speed in the buffer 93, and executed the subsequent processing steps.

As described above, when a sampling result is obtained, determination is made as to whether the Main MCU 81 is active or not, and when it is determined that the Main MCU 81 is active, the sampling result is immediately reported, so that the Main MCU 81 can execute the processing with high responsibility to a sampling result.

Figure 22:
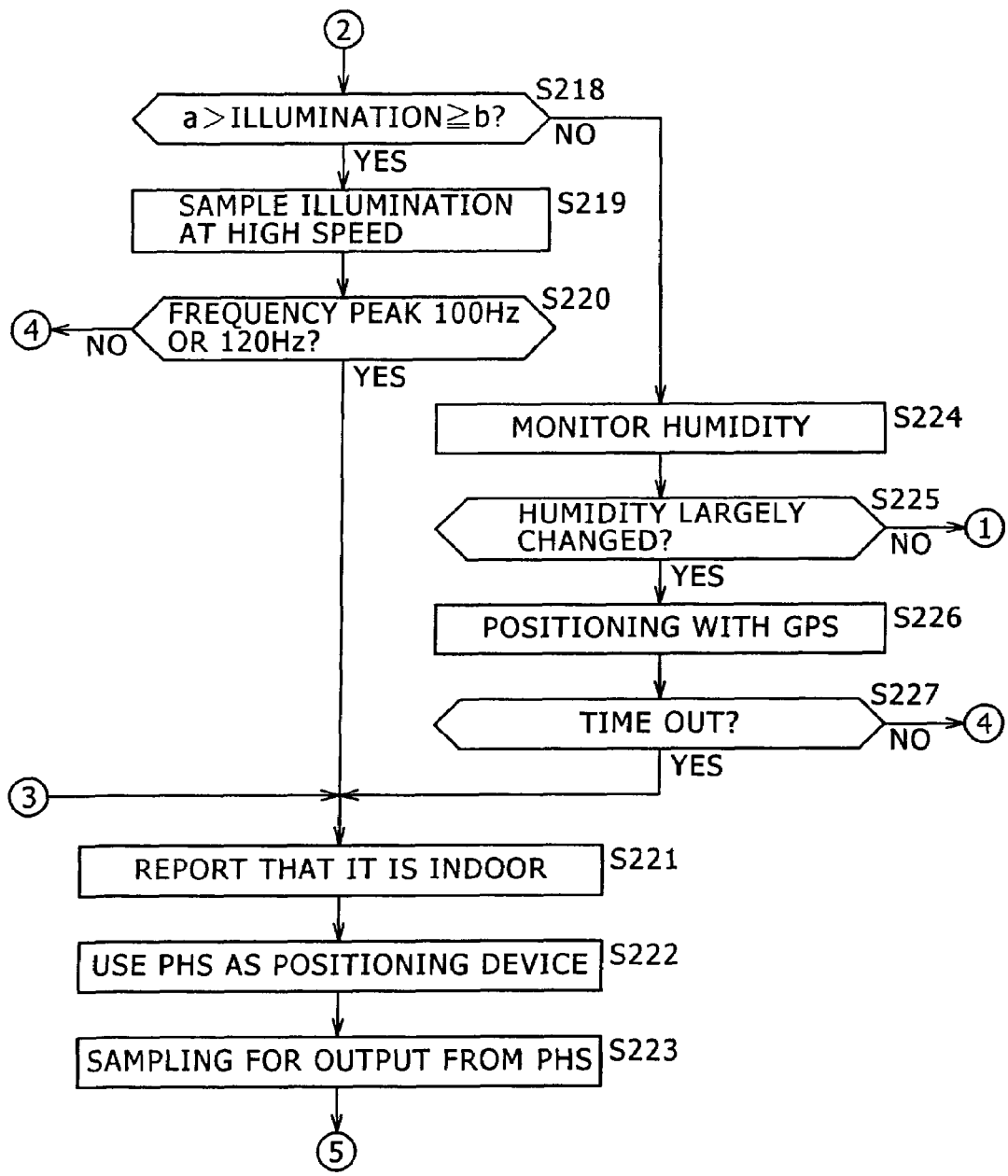
FIG. 22 is another flow chart in succession to FIG. 20 for illustrating the processing by the Sub MCU shown in FIG. 19.

On the other hand, when it is determined in step S205 (FIG. 20) based on a result of monitoring the illumination that the detected illumination is less than the threshold value a, the situation detecting section 71 goes to step S218 (FIG. 22).

In step S218, the situation detecting section 71 determines whether the detected illumination is less than the threshold value a and not lower than a threshold value b (a>b) or not, and when it is determined that the detected illumination is less than the threshold value a and not lower than the threshold value b, the situation detecting section 71 goes to step S219, and makes the sampling section 24 execute high speed sampling for illumination.

By converting the illumination (shown along the time axis) to a value on the frequency axis and by detecting a band to which the frequency allowing the highest sensitivity belongs, the situation detecting section 71 can determine whether the information processing apparatus is now under solar light or under a fluorescent lamp.

In step S220, the situation detecting section 71 determines where the frequency allowing the highest sensitivity is 100 Hz or 120 Hz.

A lighting apparatus such as a fluorescent lamp flickers at a frequency two times higher than a frequency of AC utility power (50/60 Hz), and therefore the frequency of 100 Hz or 120 Hz allowing the highest frequency indicates that the information processing apparatus is currently indoor. When the frequency allowing the highest sensibility is in the other frequency band, it indicates that the light source is the sun, namely that the information processing apparatus is outdoor.

Therefore, when it is determined in step S220 that the frequency allowing the highest sensibility is not removing force measuring device 100 Hz nor 120 Hz, the situation detecting section 71 goes to step S208, reports to the Main MCU 81 that the information processing apparatus is currently outdoor, and then executes the subsequent steps.

When it is determined in step S220 that the frequency allowing the highest sensibility is removing force measuring device 100 Hz or 120 Hz, the situation detecting section 71 goes to step S221, and reports to the Main MCU 81 that the information processing apparatus is indoor. Also when it is determined in step S207 shown in FIG. 20 that a dose of the UV ray is less than the threshold value, the situation detecting section 71 reports the fact to the Main MCU 81.

Figure 23:
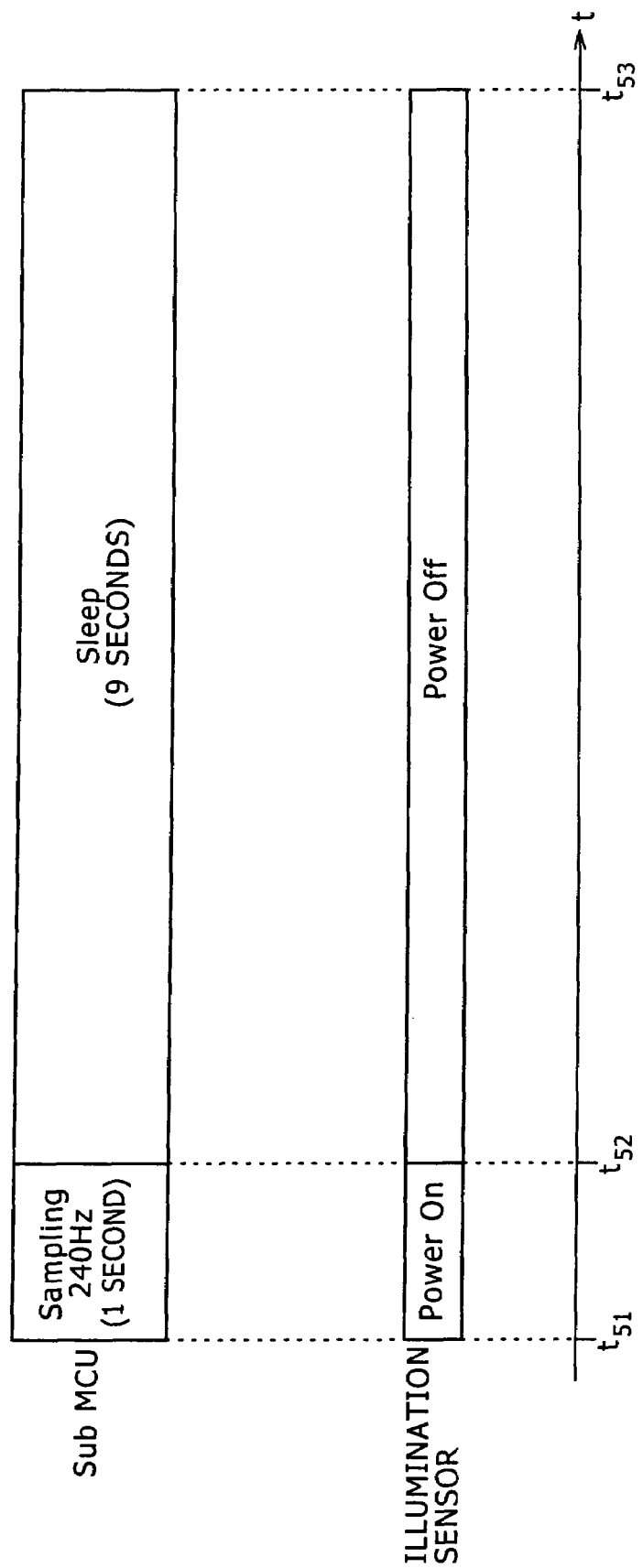
FIG. 23 is a view showing an example of an intermittent operation of an illumination sensor.

When the high speed sampling for illumination in step S219 is to be carried out for a relatively long time, the sampling operation may be carried out intermittently as shown in FIG. 23.

In the example shown in FIG. 23, the time from the time point $t_{51}$ to the time point $t_{53}$ is 10 seconds. In this case, the high speed sampling with the frequency of 240 Hz is performed only for one second in the period of time point $t_{51}$ to the time point $t_{52}$ to determine whether the information processing apparatus is indoor or outdoor.

When the Sub MCU 82 changes the operating state to the run state or the sleep state, the Sub MCU 82 also turns ON or OFF the power Vcc for the illumination sensor 56, and enter the sleep state at the time point $t_{52}$ and on.

As a light source does not change so quickly, a change in the situation can be detected by the intermittent sampling as described above. Further while high speed sampling is being executed, a work load to the Sub MCU 82, and also a consumed power increases, so that the period of time should preferably be as short as possible.

Again in FIG. 22, the situation detecting section 71 reports to the Main MCU 81 that the information processing apparatus is indoor, and then in step S222, selects the PHS module 52 as a device for positioning the information processing apparatus, and controls the power control section 21, for instance, to start supply of the power Vcc to the PHS module 52. Further when the power Vcc to the GPS module 51 is supplied, the situation detecting section 71 terminates the power supply.

In step S223, the sampling section 24 performs sampling for an output from the PHS module 52, goes to step S211, stores the positioning result in the buffer 93, and then executes the subsequent processing steps.

As described above, by using the sensors according to the current situation, namely, for instance, by using the PHS module 52 indoor, as a positioning device when the information processing apparatus is indoor, and the GPS module 51 when the information processing apparatus is outdoor, positioning can be executed accurately.

On the other hand, when it is determined in step S218 that the detected illumination is less than the threshold value b, the situation detecting section 71 goes to step S224 and monitors a result of sampling for an output from the humidity sensor 55 supplied from the sampling section 24.

In step S225, the situation detecting section 71 determines whether the change rate in the humidity is larger than a width indicated by a threshold value or not. In step S225, the situation detecting section 71 determines that the humidity has largely changed, goes to step S226, controls the power control section 21 to supply the power Vcc to the GPS module Vcc for positioning with the GPS module 51.

In step S227, the situation detecting section 71 determines based on an output from the sampling section 24, whether a predetermined period of time is over or not, namely whether the GPS module 51 has succeeded in acquiring the satellite or not.

When it is determined in step S227 that the predetermined period of time is over, the situation detecting section 71 goes to step S221, reports to the Main MCU 81 that the information processing apparatus is indoor, and on the contrary, when it is determined that the predetermined period of time is not over, namely that the satellite has been caught, the situation detecting section 71 goes to step S208 (FIG. 20), and reports to the Main MCU 81 that the information processing apparatus is outdoor. Then the processing steps in step S221 and one, or in step S209 and on are executed.

Figure 20:
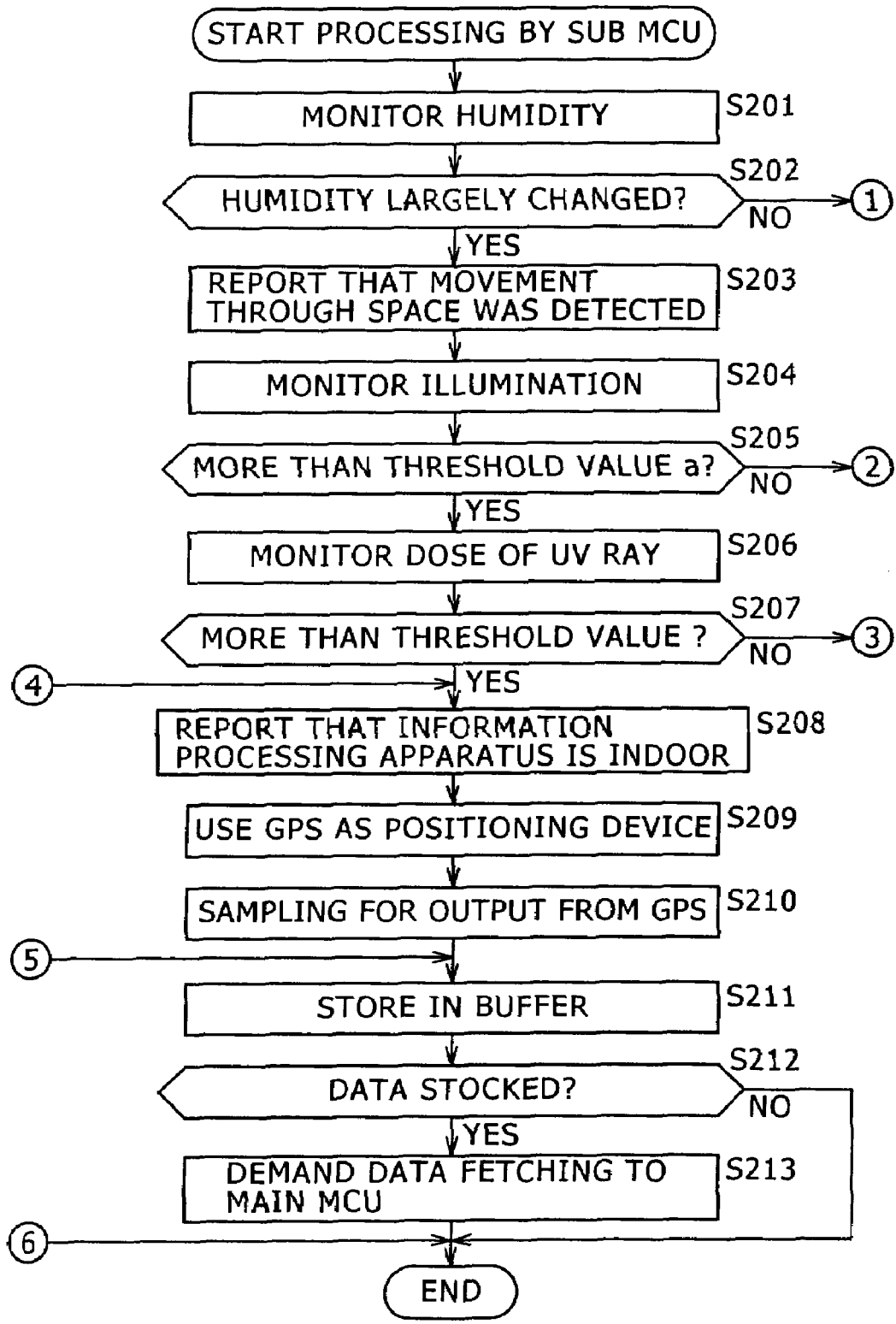
FIG. 20 is a flow chart for illustrating the processing by a Sub MCU shown in FIG. 19.

Next, the processing by the Main MCU 81 executed in response to the processing steps shown in FIG. 20 through FIG. 22 is described.

In step S231, the Main MCU 81 in the sleep state receives a report from the Sub MCU 82 (for instance a report concerning the steps S203, S208 shown in FIG. 20, or a demand in step S213).

In step S232, the Main MCU 81 determines whether the received report is a demand for acquisition of a sampling result (the demand in step S213 shown in FIG. 20) or not, and when it is determined that the received report is not the demand as described above, the MCU 81 terminates the processing.

On the other hand, when it is determined in step S232 that the received report is a demand for acquisition of a sampling result, the Main MCU 81 goes to step S233, and is restored from the sleep state.

After the Main MCU81 is restored from the sleep state, in step S234, the Main MCU 81 fetches data indicating a sampling result stored in the buffer 93 of the Sub MCU 82 via a bus, and executes a predetermined processing step based on the sampling result.

As described above, by making the Sub MCU 82 consuming a power less execute sampling for outputs from the sensors, controlling supply of the power Vcc to the sensors based on the situation under which an information processing apparatus is placed, and provide a certain volume of sampling results to the Main MCU 81 in batch, it is possible to shortening a operating time of the Main MCU 81 consuming a power much, so that the power consumption in the entire device can be reduced.

The configuration shown in FIG. 19 in which the Main MCU 81 and the Sub MCU 82 are prepared in one information processing apparatus may be employed only when, for instance, a sensor executing sampling with a short cycle is prepared as the sensor 3. When a sensor operating with a long cycle is prepared as the sensor 3, the state transition corresponding to the sampling cycle can be realized by the Main MCU 81.

In the description above, it is assumed that the PHS module 52 is used as a positioning device when the information processing apparatus is indoor, but positioning by the PHS module 52 is carried out based on information from a base station transmitting electric waves which the PHS module 52 receives, and the precision is worse than that in positioning by the GPS module 51, and is about 400 m.

Therefore, in this case, like in the case of the GPS module 51 (with the precision of 20 m) described above, when it is determined based on the speed obtained from an output from the gyro 53 or the acceleration sensor 54 that a travel of the information processing apparatus within a positioning cycle is not more than 400 m, the power Vcc is not supplied to the PHS module 52, and when the travel is over 400 m, the power Vcc may be supplied to the PHS module 52.

Further it is needless to say that the PHS module 52 may be used outdoors. In this case, in order to activate the PHS module 52 only when accurate positioning is possible, supply of the power Vcc to the PHS module 52 may be stopped when it is determined based on an output from the gyro 52 or acceleration sensor 54 that the PHS module 52 is moving at a speed of, for instance, 80 km or more.

As described above, various modes of control other than that shown in FIG. 12 may be employed for controlling other sensors according to the situation.

For instance, by controlling operation of a CCD (Charge Coupled Device) so that a shutter speed of a CCD is made faster, it is possible to pick up an image with little blurring.

On the other hand, when it is determined based on an output from the acceleration sensor that the PHS module 52 moves little, by controlling operations of the CCD so that the shutter speed is made slower, it is possible to secure a sufficient quantity of light.

Further the state transition as shown in FIG. 2 or FIG. 8 can be realized with the MCU 1 shown in FIG. 12 or by the Sub MCU 82 shown in FIG. 19.

Although the operation sequence described above may be executed by hardware, the operation sequence may be executed with software. In this case, a device used for running the software includes, for instance, a personal computer as shown in FIG. 25.

In FIG. 25, a CPU (Central Processing Unit) 101 executes various types of processing according to programs stored in a ROM 102 or loaded from a storage section 108 into a RAM 103. Also data required for execution of various types of processing by the CPU 101 is stored in the RAM 103 according to the necessity.

The CPU 101, ROM 102, and RAM 103 are connected to each other via a bus 104. Also an input/output interface 105 is connected to this bus 104.

Connected to the input/output interface 105 are an input section 106 including a keyboard and a mouse, a display including an LCD or the like, and an output section 107 including a speaker or the like, a storage section 108 including a hard disk or he like, and a communicating section 109 for executing processing for communication via a network.

Also a drive 110 may be connected to the input/output interface 105 with such devices as a magnetic disk, an optical disk, a magnetic optical disk, or a semiconductor memory incorporated thereon according to the necessity, and a computer program read out therefrom is installed in the storage section 108.

When the operation sequence is executed by software, a program or programs each constituting the software is installed from the network or a recording medium into, for instance, a computer incorporated in the dedicated hardware, or a general purpose personal computer capable of executing various types of functions when required programs are installed therein.

This recording medium may include, as shown in FIG. 25, not only a magnetic disk (including a flexible disk), an optical disk (CD-ROM (Compact Disk-Read Only Memory), and a DVD (including Digital Versatile Disk)), a magnetic optical disk (including MD (Registered trade mark) (Mini-Disk)) each with a program recorded therein distributed to provide the program to a user, or a removable media 111 including a semiconductor memory or the like, but also a ROM 102 with the program recorded therein, or a hard disk included in the storage section 108.

The processing steps described in this specification include not only those executed according to the order described therein or sequentially, but also those which are not always executed sequentially and executed concurrently or discretely.

The term "system" as used herein indicates an entire apparatus including a plurality of devices.

What is claimed is:

1. An information processing apparatus, comprising:
    a plurality of detection units, each configured to detect a physical quantity as a target for detection; and
    a control unit configured to measure the physical quantity based on a result of detection by one or more first detection units among the plurality of detection units and also configured to control a supply of power to a second detection unit in response to a result of measurement of the physical quantity, wherein
    the second detection unit includes a first positioning unit configured to execute positioning outdoors, and a second positioning unit configured to execute positioning indoors, and
    the control unit, when it is determined from a dose of ultraviolet rays measured based on a result of detection by the first detection unit that the control unit is present outdoors, is configured to set a higher priority to the first positioning unit as compared to the second positioning unit, and is configured to control a supply of power to the first and second positioning units so that positioning is executed only by the first positioning unit.

2. The information processing apparatus according to claim 1, wherein the control unit is configured to measure, when the supply of power to the second detection unit is started, the physical quantity based on a result of detection by the second detection unit.

3. The information processing apparatus according to claim 1, wherein the first detection unit is configured to consume less power than the second detection unit.

4. The information processing apparatus according to claim 1, wherein the control unit is configured to control the supply of power to the second detection unit so that a positioning executed by the second detection unit is executed only when a distance obtained by multiplying a speed measured based on a result of detection by the first detection unit by a time cycle period of positioning by the second detection unit has a precision that is higher than a precision of a positioning by the second detection unit.

5. The information processing apparatus according to claim 1 wherein the control unit is configured to control the supply of power to the second detection unit so that positioning is executed by the first positioning unit when a change in humidity measured based on a result of detection by the first detection unit is over a predetermined threshold value.

6. The information processing apparatus according to claim 1, further comprising:
    a storage unit configured to store therein a period of time after measurement of a physical quantity by the control unit based on a result of detection by a third detection unit among the plurality of detection units is finished until measurement of the physical quantity is executed next as a standby period with the control unit being configured to shift to a standby state during the standby period,
    wherein the control unit is configured to repeat a processing of starting a supply of power to the third detection unit and measuring the physical quantity based on a result of detection by the third detection unit, stopping the supply of power to the third detection unit after the measurement of the physical quantity is executed by the control unit, shifting the control unit to the standby state, and returning the control unit from the standby state after passage of the standby period to restart the processing.

7. The information processing apparatus according to claim 1, further comprising:
    a storage unit configured to store therein a period of time after a supply of power to a third detection unit among the plurality of detection units is started until a normal result of detection by the third detection unit is obtained as a standby period with the control unit being configured to shift to a standby state during the standby period,
    wherein the control unit is further configured to start the supply of power to the third detection unit, shift to the standby state, return from the standby state after passage of the standby period, and measure the physical quantity based on a result of detection by the third detection unit.

8. The information processing apparatus according to claim 1, further comprising:
    a storage unit configured to store therein data indicating the physical quantity measured by the control unit,
    wherein the control unit is configured to supply, when a predetermined volume of data indicating the physical quantity is stored by the storage unit, the predetermined volume of data indicating the physical quantity to another control unit, the another control unit being configured to execute a predetermined processing on the predetermined volume of data indicating the physical quantity.

9. The information processing apparatus according to claim 1, wherein the control unit, when it is determined from the dose of ultraviolet rays measured based on the result of detection by the first detection unit that the control unit is present outdoors, is configured to control the supply of power to the first and second positioning units so that positioning is executed only by the first positioning unit by stopping the supply of power to the second positioning unit.

10. The information processing apparatus according to claim 1, wherein
    the first positioning unit is a global positioning system (GPS) module, and
    the second positioning unit is a cellular phone module.

11. An information processing apparatus, comprising:
    a plurality of detection units, each configured to detect a physical quantity as a target for detection; and
    a control unit configured to measure the physical quantity based on a result of detection by one or more first detection units among the plurality of detection units and also configured to control a supply of power to a second detection unit in response to a result of measurement of the physical quantity, wherein the first detection unit includes a first sensor configured to detect illumination intensity and a second sensor configured to detect a dose of ultraviolet rays, and the control unit is configured to control a supply of power to the second sensor so that detection of a dose of ultraviolet rays is executed by the second sensor when an illumination intensity over a predetermined threshold value is detected by the first sensor.

12. An information processing apparatus according to claim 11, wherein the second detection unit includes a first positioning unit configured to execute positioning outdoors, and a second positioning unit configured to execute positioning indoors, and the control unit, when it is determined from a dose of ultraviolet rays measured based on a result of detection by the first detection unit that the control unit is present outdoors, is configured to set a higher priority to the first positioning unit as compared to the second positioning unit, and control a supply of power to the first and second positioning units so that positioning is executed only by the first positioning unit.

13. The information processing apparatus according to claim 12, wherein the control unit, when it is determined from the dose of ultraviolet rays measured based on the result of detection by the first detection unit that the control unit is present outdoors, is configured to control the supply of power to the first and second positioning units so that positioning is executed only by the first positioning unit by stopping the supply of power to the second positioning unit.

14. The information processing apparatus according to claim 12, wherein the first positioning unit is a global positioning system (GPS) module, and the second positioning unit is a cellular phone module.

15. The information processing apparatus according to claim 11, wherein the control unit is configured to control the supply of power to the second sensor by stopping the supply of power to the second sensor until an illumination intensity over the predetermined threshold value is detected by the first sensor.

16. An information processing method for an information processing apparatus which includes a plurality of detection units, each configured to detect a physical quantity as a target for detection, a control unit configured to measure the physical quantity based on a result of detection by a first detection unit among the plurality of detection units and also configured to control a supply of power to each of the plurality of detection units, the first detection unit including a first sensor configured to detect illumination intensity and a second sensor configured to detect a dose of ultraviolet rays, and the second detection unit including a first positioning unit configured to execute positioning outdoors and a second positioning unit configured to execute positioning indoors, the method comprising:

measuring, with the control unit, an illumination intensity detected by the first sensor;

comparing the measured illumination intensity to a predetermined threshold value;

supplying power to the second sensor if the measured illumination intensity is above the predetermined threshold value, and measuring, with the control unit, a dose of ultraviolet rays detected by the second sensor.

17. The information processing method according to claim 16, further comprising:

determining, with the control unit, whether the information processing apparatus is located outdoors based on the measured dose of ultraviolet rays, the control unit determining the information processing apparatus as being located indoors if the illumination intensity is below the predetermined threshold value; and detecting a position using the first positioning unit, if the control unit determines the information processing apparatus is located outdoors, and using the second positioning unit, if the control unit determines the information processing apparatus is located indoors.

18. The information processing method according to claim 17, further comprising:

controlling, with the control unit, a supplying of power to the first and second positioning units so that the detecting a position is performed only using the first positioning unit if the control unit determines the information processing apparatus is located outdoors.

19. The information processing method according to claim 17, wherein the detecting a position using the first positioning unit comprises detecting with a global positioning system (GPS) module, and the detecting a position using the second positioning unit comprises detecting with a cellular phone module.

* * * * *